(12) United States Patent
Hashimoto et al.

(10) Patent No.: US 12,244,728 B2
(45) Date of Patent: Mar. 4, 2025

(54) DATA PROTECTION APPARATUS, ELECTRONIC APPARATUS, METHOD, AND STORAGE MEDIUM

(71) Applicant: KABUSHIKI KAISHA TOSHIBA, Tokyo (JP)

(72) Inventors: Mikio Hashimoto, Tokyo (JP); Atsushi Shimbo, Tokyo (JP); Jiro Amemiya, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 268 days.

(21) Appl. No.: 17/903,291

(22) Filed: Sep. 6, 2022

(65) Prior Publication Data

US 2023/0299971 A1    Sep. 21, 2023

(30) Foreign Application Priority Data

Mar. 18, 2022   (JP) ................. 2022-044291

(51) Int. Cl.
*H04L 9/32*     (2006.01)
*G06F 21/64*     (2013.01)
(Continued)

(52) U.S. Cl.
CPC ............ *H04L 9/3247* (2013.01); *G06F 21/64* (2013.01); *H04L 9/0861* (2013.01);
(Continued)

(58) Field of Classification Search
CPC ........ G06F 21/50; G06F 21/55; G06F 21/552; G06F 21/60; G06F 21/64; G06F 2221/21;
(Continued)

(56) References Cited

U.S. PATENT DOCUMENTS 9,064,094 B1   6/2015   Bailey et al.
2006/0282675 A1   12/2006   Yao
(Continued)

FOREIGN PATENT DOCUMENTS

JP    2006511877 A    4/2006
JP    2006254204 A    9/2006
(Continued)

OTHER PUBLICATIONS

Hett, et al., "Security and Non-Repudiation for Voice-Over-IP Conversations", 2006, 14 pages, DOI: 10.48550/ARXIV.CS/0606068.
(Continued)

*Primary Examiner* — D'Arcy Winston Straub
(74) *Attorney, Agent, or Firm* — Holtz, Holtz & Volek PC

(57) ABSTRACT

According to one embodiment, a data protection apparatus includes a processor configured to execute an encryption process on log data including a data frame including a plurality of pieces of data generated along a time sequence. The processor is configured to encrypt each of the pieces of data with a corresponding encryption key among a first initial key and a first encryption keys generated in a forward direction to a time sequence of the pieces of data. The processor is configured to encrypt each of a plurality of pieces of data encrypted with the corresponding encryption key with a corresponding encryption key among a second initial key and a second encryption keys generated in a backward direction to a time sequence of the pieces of data.

10 Claims, 12 Drawing Sheets

(51) Int. Cl.
   *H04L 9/08* (2006.01)
   *H04L 9/14* (2006.01)
   *G06F 21/55* (2013.01)

(52) U.S. Cl.
   CPC ............. *H04L 9/0894* (2013.01); *H04L 9/14* (2013.01); *H04L 9/3268* (2013.01); *G06F 21/552* (2013.01); *G06F 2221/2101* (2013.01)

(58) Field of Classification Search
   CPC . G06F 2221/2101; H04L 9/08; H04L 9/0861; H04L 9/0894; H04L 9/14; H04L 9/32; H04L 9/3247; H04L 9/3263; H04L 9/3268
   See application file for complete search history.

(56) References Cited

U.S. PATENT DOCUMENTS

| | | | |
|---|---|---|---|
| 2011/0162083 A1 | 6/2011 | Apvrille et al. | |
| 2012/0033809 A1* | 2/2012 | Huang | H04L 9/0662 380/46 |
| 2021/0091928 A1* | 3/2021 | Dockser | H04L 9/0637 |
| 2022/0188222 A1 | 6/2022 | Hashimoto et al. | |

FOREIGN PATENT DOCUMENTS

| | | |
|---|---|---|
| JP | 2006345408 A | 12/2006 |
| JP | 2009070159 A | 4/2009 |
| JP | 2010257475 A | 11/2010 |
| JP | 5076110 B2 | 9/2012 |
| JP | 2022094755 A | 6/2022 |
| WO | 0031956 A2 | 6/2000 |
| WO | 2004061667 A1 | 7/2004 |

OTHER PUBLICATIONS

Hirosato, et al., "Secure MCU Platform Techniques to Ensure Security of Cyber-Physical Systems", Toshiba Review (vol. 74, No. 6), 2019, pp. 25-29.

Lamport, "Password Authentication with Insecure Communication", Communications of the ACM (vol. 24, No. 11), 1981, pp. 770-772, DOI: 10.1145/358790.358797.

Qi, et al., "Efficient Data Access Control With Fine-Grained Data Protection in Cloud-Assisted IIoT", IEEE Internet of Things Journal (vol. 8, No. 4), 2021, pp. 2886-2899, DOI: 10.1109/JIOT.2020.3020979.

Japanese Office Action (and an English language translation thereof) dated Dec. 3, 2024, issued in counterpart Japanese Application No. 2022-044291.

Isawa, et al., "Proposal of Time-limited Key Management Scheme Using One-way Functions", IEICE Technical Report (vol. 110, No. 266), 2010, pp. 11-15.

Nakazato, et al., "Design and Implementation of the Secure Bookmark System", Multimedia Communication and Distributed Processing System Workshop (vol. 2005, No. 19), 2005, pp. 427-431.

* cited by examiner

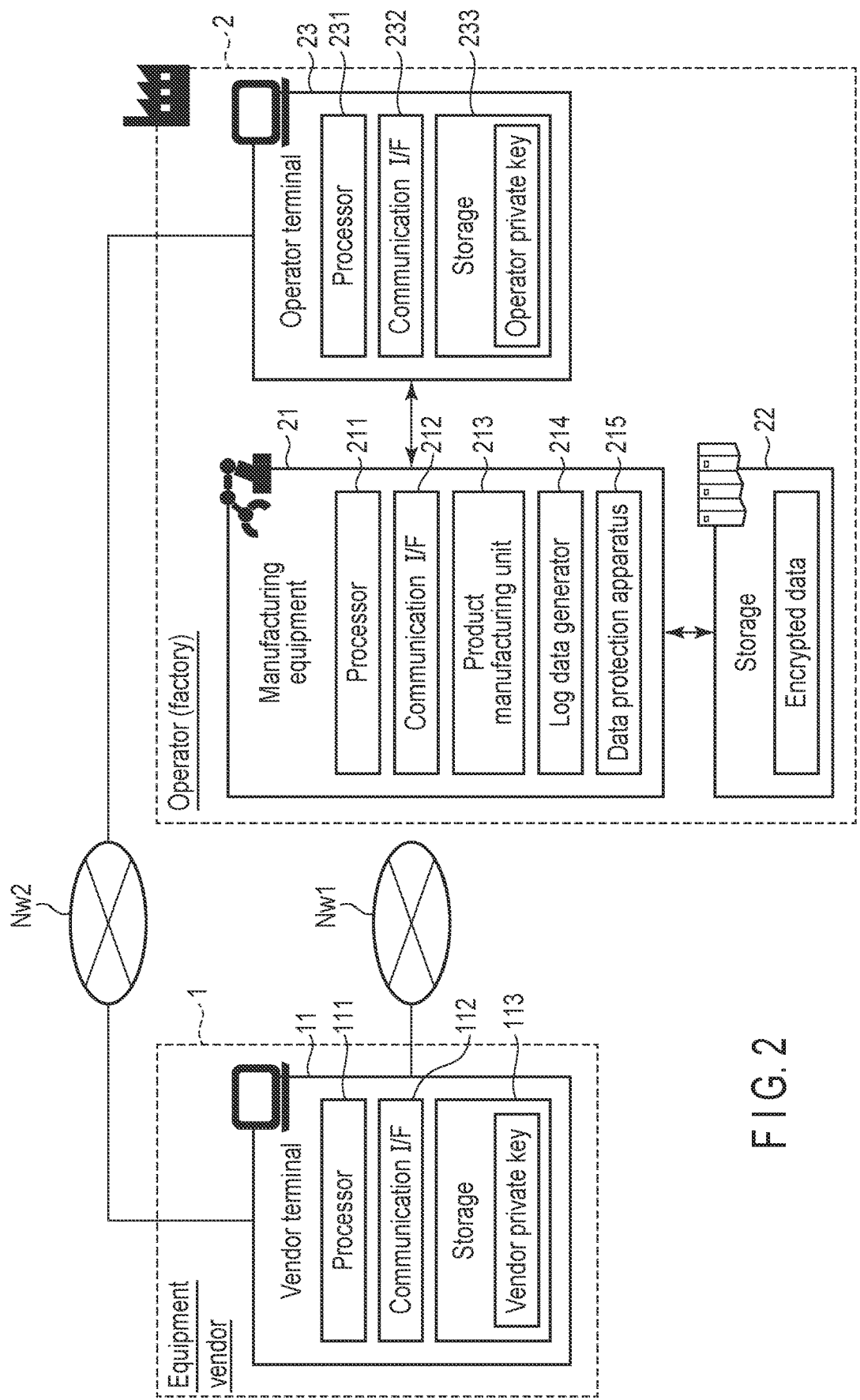
F I G. 2

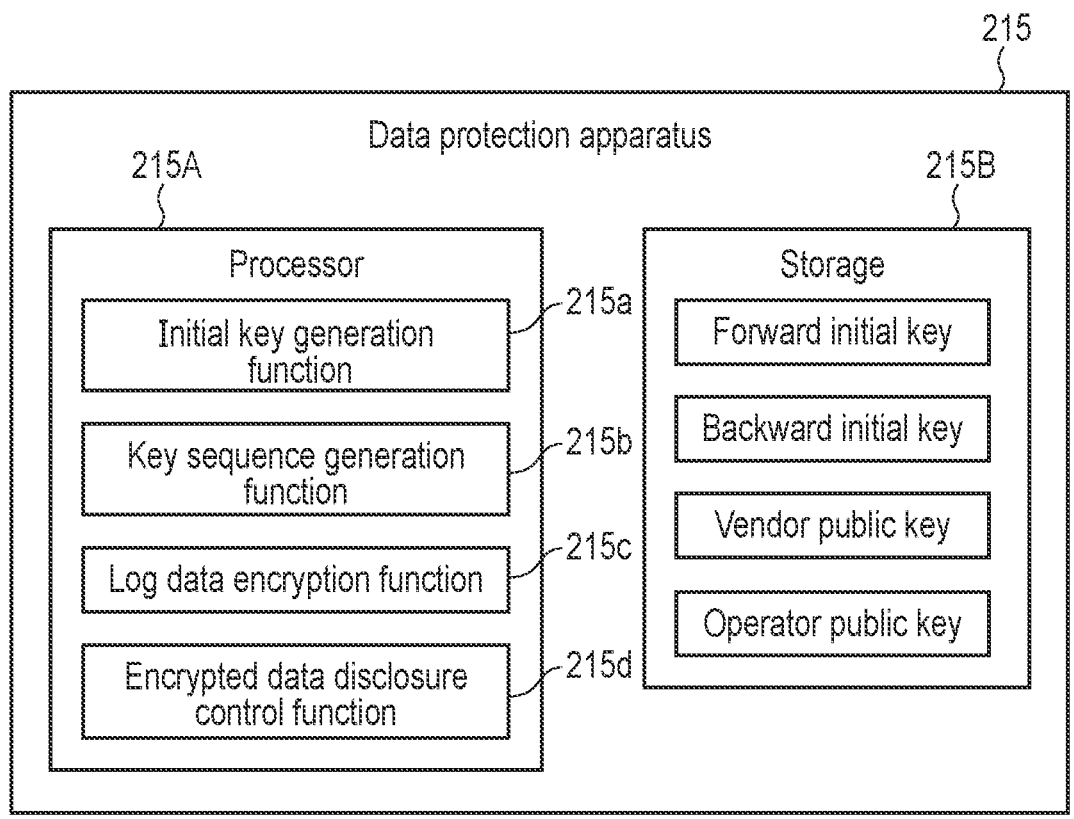
F I G. 3
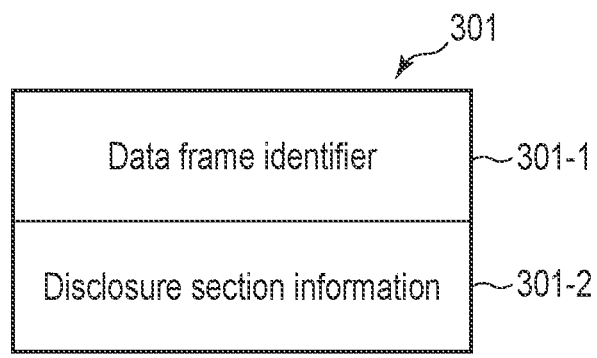
F I G. 4

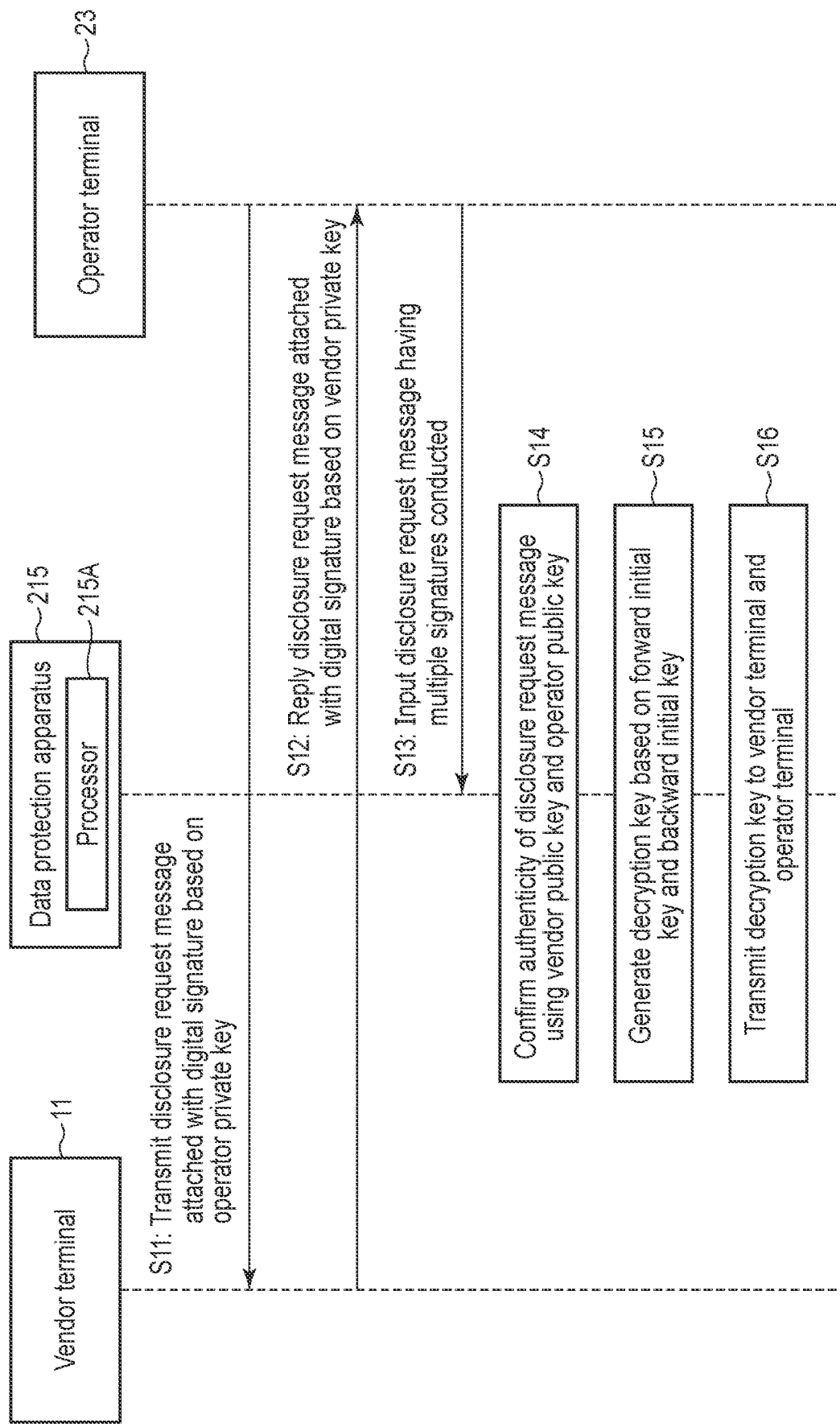
F I G. 7

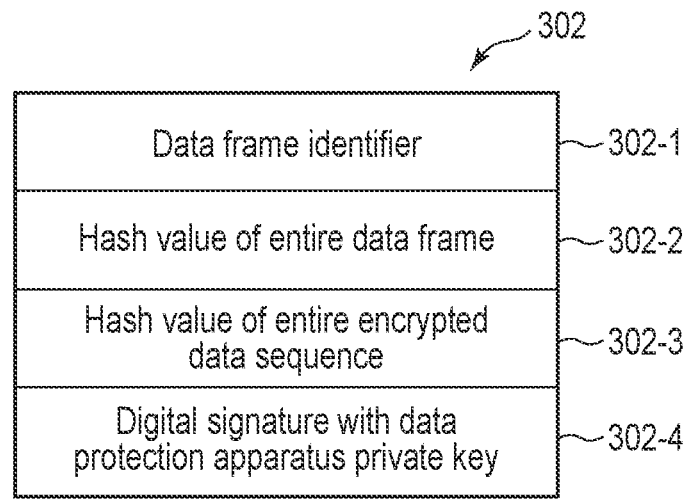
F I G. 11
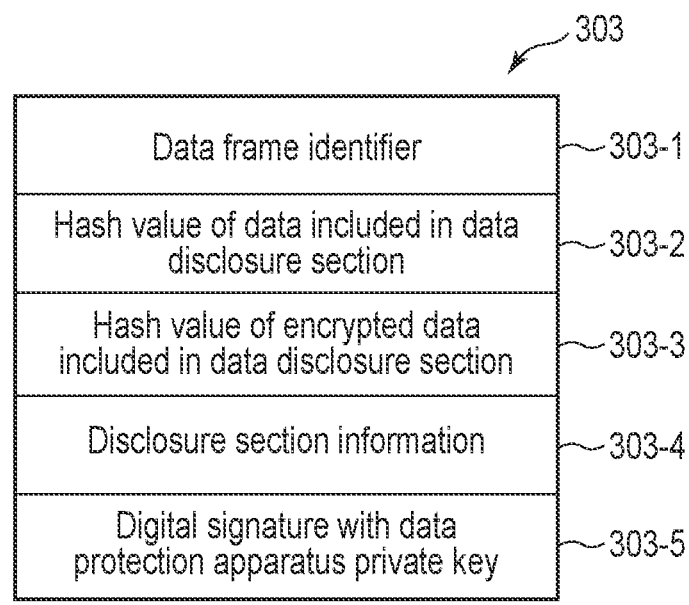
F I G. 12

DATA PROTECTION APPARATUS, ELECTRONIC APPARATUS, METHOD, AND STORAGE MEDIUM

CROSS-REFERENCE TO RELATED APPLICATIONS

This application is based upon and claims the benefit of priority from Japanese Patent Application No. 2022-044291, filed Mar. 18, 2022, the entire contents of which are incorporated herein by reference.

FIELD

Embodiments described herein relate generally to a data protection apparatus, an electronic apparatus, a method, and a storage medium.

BACKGROUND

For example, in information processing systems such as a product manufacturing system, a power control system, and a communication system, various pieces of data are generated in. Among them, there is log data that is time-series data. The log data has been mainly used for maintenance of an information processing system and an equipment included in the information processing system.

However, with the development of Internet of Things (IoT) technology in recent years, the value of log data as big data is increasing, and the log data is used not only for maintenance of an information processing system and an equipment but also for data mining for extracting a potential problem of the system and the equipment and refining the potential problem. As described above, while the value of the log data as big data increases, the log data has a problem of right of use.

The log data includes both the know-how of an operator who operates the information processing system and the know-how of an equipment vendor who provides the equipment included in the information processing system to the operator. The operator and the equipment vendor do not desire to disclose log data to others in order to suppress leakage of the know-how of the operator and the equipment vendor to the outside. However, the operator and the equipment vendor desire to use the log data for the data mining described above.

For example, the operator desires to use log data in order to operate an information processing system more efficiently. However, does not desire to disclose the log data to others including the equipment vendor because the operator does not desire to leak know-how relating to system operation to the outside. On the other hand, the equipment vendor desires to use log data in order to refine and improve performance of the equipment. However, does not desire to leak know-how relating to the equipment to the outside, and thus, there is a demand for others including the operator not to disclose the log data.

As described above, there is a potential conflict of interest between the operator and the equipment vendor. Therefore, it is desirable that the operator and the equipment vendor share the log data after minimizing the leakage of sensitive data to the outside by, for example, establishing a confidentiality agreement for the sensitive data regarding the know-how of both of the operator and the equipment vendor among a large number of pieces of data included in the log data. However, it is difficult to determine which data included in the log data corresponds to sensitive data before system operation. For example, it is likely that data for which a confidentiality agreement is not concluded corresponds to sensitive data, and know-how is leaked to the outside in an unintended manner.

In addition, the operator and the equipment vendor sometimes have to disclose log data to a third party. This corresponds to an audit by a customer or a third party organization. It is conceivable that the audit is performed on the log data of a product or an information service providing apparatus, for example, in the case in which there is a claim from a customer regarding the quality of the product or an information service provided to the customer or in the case in which there is a suspicion of nonconformity with the legal standard. In such an audit, since what kind of log data has to be disclosed is not necessarily known in advance, there is also a problem that it is difficult to determine all arrangements (i.e., handling of log data at the time of audit) regarding a response to the audit between the operator and the equipment vendor before the system operation.

As described above, it is difficult to determine all the various arrangements regarding the handling of the log data before the system operation. Therefore, it is desired to realize a technology capable of selecting and disclosing data included in a predetermined section when data included in the predetermined section among a large number of pieces of data included in log data is required even though various rules regarding handling of log data are not determined before system operation.

BRIEF DESCRIPTION OF THE DRAWINGS

FIG. 2 illustrates a configuration example of an information processing system including a data protection apparatus according to an embodiment.

FIG. 3 illustrates a configuration example of the data protection apparatus according to the embodiment.

FIG. 4 illustrates a data configuration example of a disclosure request message according to the embodiment.

FIG. 7 is a sequence chart that describes a series of processing implemented by the data protection apparatus according to the embodiment, the processing selectively disclosing a part of encrypted data.

FIG. 11 illustrates a data configuration example of a data frame signature according to the embodiment.

FIG. 12 illustrates a data configuration example of a data section signature according to the embodiment.

DETAILED DESCRIPTION

In general, according to one embodiment, a data protection apparatus includes a processor configured to execute an encryption process on log data including a data frame. The processor is configured to generate a first initial key and a second initial key that correspond to a data frame including a plurality of pieces of data generated along a time sequence. The processor is configured to generate a first key sequence based on the first initial key and a one-way function. The first key sequence is a key sequence including an encryption key corresponding to each of the pieces of data, and the first key sequence includes the first initial key and a plurality of first encryption keys generated in a forward direction to a time sequence of the pieces of data. The processor is configured to generate a second key sequence based on the second initial key and the one-way function. The second key sequence is a key sequence including an encryption key corresponding to each of the pieces of data, and the second key sequence includes the second initial key and a plurality of second encryption keys generated in a backward direction to a time sequence of the pieces of data. The processor is configured to encrypt each of the pieces of data with a corresponding encryption key among the first initial key and the first encryption keys included in the first key sequence. The processor is configured to encrypt each of a plurality of pieces of data encrypted with the corresponding encryption key included in the first key sequence with a corresponding encryption key among the second initial key and the second encryption keys included in the second key sequence.

Hereinafter, an embodiment will be described with reference to the drawings.

Figure 1:
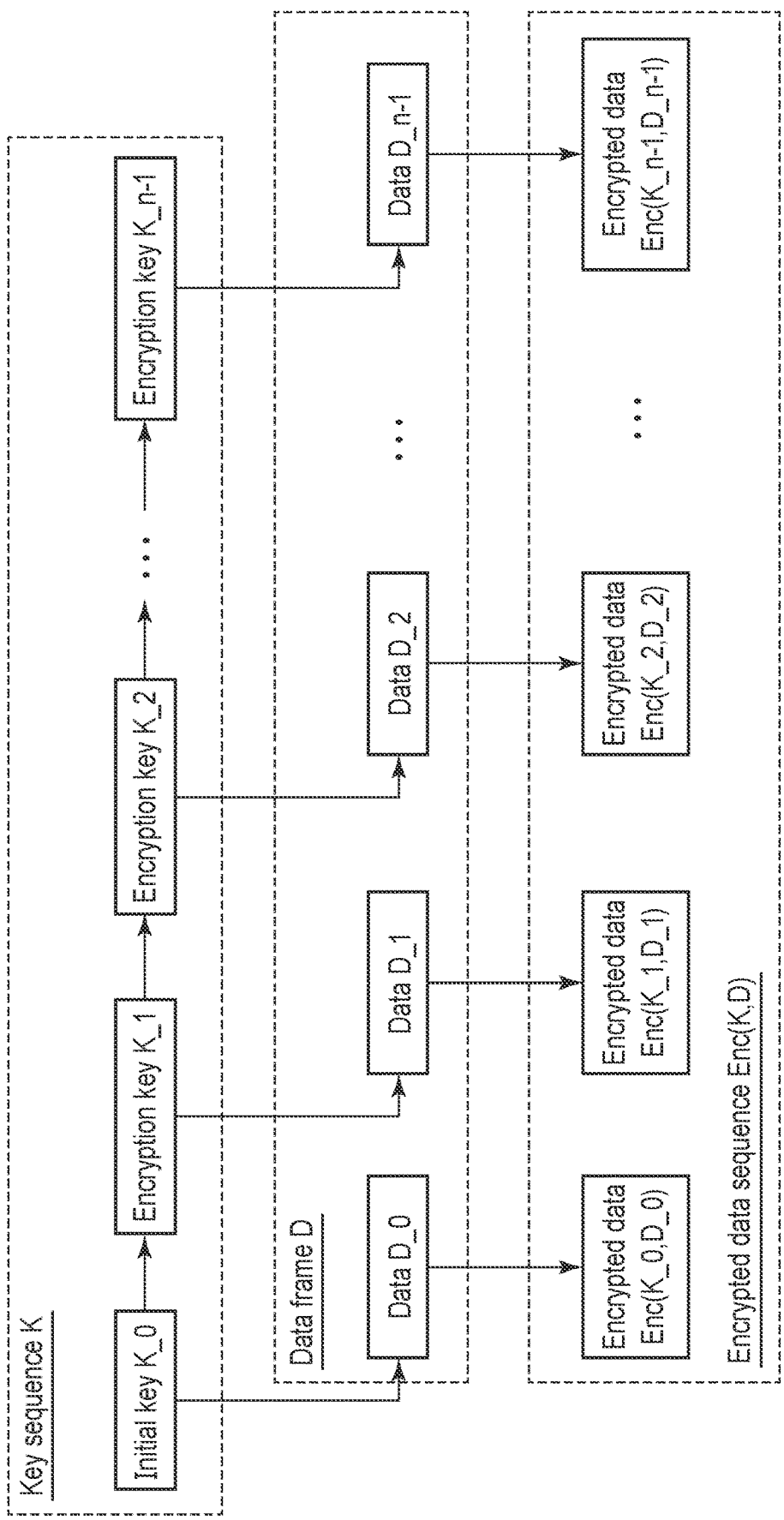
FIG. 1 is a diagram that describes the outline of an encryption process using a one-way function.

First, as a premise of the embodiment, an encryption process using a one-way function will be described with reference to FIG. 1. FIG. 1 is a diagram that describes the outline of an encryption process using a one-way function. In the encryption process using the one-way function, a key sequence including a plurality of encryption keys is generated from one encryption key using the one-way function. The first encryption key included in the key sequence is an encryption key serving as a source of a plurality of encryption keys included in the key sequence, and is also referred to as an initial key or a root key. Examples of the one-way function used to generate the key sequence include a hash function and a hash-based message authentication code (HMAC).

The key sequence is generated in units of data frames including a plurality of pieces of data. In FIG. 1, since it is assumed that a data frame D including N pieces of data $D\_0$ to $D\_n-1$ is encrypted, a key sequence K (more specifically, a key sequence K including one initial key $K\_0$ and N−1 encryption keys $K\_1$ to $K\_n-1$) including N encryption keys $K\_0$ to $K\_n-1$ is generated.

The encryption key $K\_1$ included in the key sequence K is generated by applying a hash function to the initial key $K\_0$. The encryption key $K\_2$ included in the key sequence K is generated by applying a hash function to the encryption key $K\_1$. In the following, similarly, a process of generating a new encryption key by applying a hash function to a high-order encryption key is repeatedly executed, and thus the key sequence K including N encryption keys $K\_0$ to $K\_n-1$ is generated.

Each of the N pieces of data $D\_0$ to $D\_n-1$ included in the data frame D is encrypted by the corresponding encryption key among the encryption keys $K\_0$ to $K\_n-1$ included in the key sequence K. For example, the data $D\_0$ is encrypted by the initial key $K\_0$ included in the key sequence K and output as encrypted data $Enc(K\_0, D\_0)$. In addition, the data $D\_1$ is encrypted by the encryption key $K\_1$ included in the key sequence K and output as encrypted data $Enc(K\_1, D\_1)$. The data $D\_2$ is encrypted by the encryption key $K\_2$ included in the key sequence K and output as encrypted data $Enc(K\_2, D\_2)$. Furthermore, the data $D\_n-1$ is encrypted by the encryption key $K\_n-1$ included in the key sequence K and output as encrypted data $Enc(K\_n-1, D\_n-1)$. In the present specification, a data sequence including encrypted data $Enc(K\_0, D\_0)$ to encrypted data $Enc(K\_n-1, D\_n-1)$ respectively corresponding to the N pieces of data $D\_0$ to $D\_n-1$ included in the data frame D is referred to as an encrypted data sequence $Enc(K, D)$. As an encryption algorithm used for encryption, for example, various use modes of the common key block encryption AES, for example, electronic codebook (ECB), cipher block chaining (CBC), counter with CBC-MAC (CCM), and Galois/Counter Mode (GCM) can be used. Note that in each mode of CBC, CCM, and GCM other than ECB, there are parameters such as initial vector IV in addition to the encryption key, and it is assumed that these parameters are appropriately managed. In addition, in the case in which CCM or GCM is used, a falsification verification function that confirms the presence or absence of data falsification at the time of decrypting data can be used.

A key sequence generated using a one-way function has a feature that when a predetermined encryption key included in the key sequence is known, all encryption keys lower than the predetermined encryption key can be calculated and obtained. However, no encryption key higher than the predetermined encryption key can be obtained.

For example, when the encryption key $K\_i$ (where i is $0<i<n-1$) is known among the encryption keys $K\_0$ to $K\_n-1$ included in the key sequence K, the encryption keys $K\_i+1$ to $K\_n-1$ lower than the encryption key $K\_i$ can be obtained by calculation using a one-way function. That is, when the encryption key $K\_i$ is known, not only the encrypted data $Enc(K\_i, D\_i)$ encrypted by the encryption key $K\_i$ but also the encrypted data $Enc(K\_i+1, D\_i+1)$ to the encrypted data $Enc(K\_n-1, D\_n-1)$ encrypted by the encryption keys $K\_i+1$ to $K\_n-1$ lower than the encryption key $K\_i$ can be decrypted. On the other hand, even though the encryption key $K\_i$ is known, since an encryption key higher than the encryption key $K\_i$ is not possible to be obtained, the encrypted data $Enc(K\_0, D\_0)$ to the encrypted data $Enc(K\_i-1, D\_i-1)$ are not possible to be decrypted.

In the present embodiment, a data protection apparatus capable of executing an encryption process using a key sequence having the above characteristics will be described.

FIG. 2 is a diagram illustrating a configuration example of an information processing system including the data protection apparatus according to the present embodiment. Note that in the present embodiment, the case will be described in which the information processing system is a product manufacturing system. However, the present invention is not limited to this, and the information processing system may be a power control system or a communication system.

In the present specification, an equipment vendor refers to a person who manufactures a manufacturing equipment and provides the manufacturing equipment to an operator (factory). The manufacturing equipment may be referred to as a production equipment or an electronic apparatus. In addition, in the present specification, an operator refers to a person who manufactures a product using a manufacturing equipment provided by the equipment vendor and ships the product to a sales store or the like. For example, the equipment vendor is a rubber vibration isolator manufacturing equipment vendor that manufactures a manufacturing equipment that manufactures a rubber vibration isolator product, and the operator is a chemical manufacturer that manufactures a rubber vibration isolator product using the manufacturing equipment and a raw material of the rubber vibration isolator. In the case in which it is found that a part of the shipped rubber vibration isolator product does not meet the quality standards, it is assumed that the supervising organization of the quality standards orders the operator to submit log data at the time of manufacturing and inspecting the product, and the operator submits the log data at the time of manufacturing and inspecting the product to the supervising organization in agreement with the equipment vendor.

As illustrated in FIG. 2, an equipment vendor 1 includes a vendor terminal 11. The vendor terminal 11 is, for example, a PC, a tablet terminal, a smartphone, or the like that can be operated by the equipment vendor 1. The vendor terminal 11 is communicably connected to a manufacturing equipment 21 described later via a first network Nw1. In addition, the vendor terminal 11 is communicably connected to an operator terminal 23 described later via a second network Nw2. Note that FIG. 1 illustrates the case in which the vendor terminal 11 is communicably connected to the manufacturing equipment 21 via the first network Nw1 and communicably connected to the operator terminal 23 via the second network Nw2. However, the vendor terminal 11 may be communicably connected to both the manufacturing equipment 21 and the operator terminal 23 via one network.

The vendor terminal 11 includes a processor 111, a communication I/F 112, and a storage 113. The processor 111 controls the operation of the vendor terminal 11. The communication I/F 112 is a communication interface that communicably connects the vendor terminal 11 to the manufacturing equipment 21 and the operator terminal 23. In the storage 113, a vendor private key used for digital signature described below is stored at the start of system operation.

As illustrated in FIG. 2, an operator 2 includes the manufacturing equipment 21, a storage 22, and the operator terminal 23. The manufacturing equipment 21 is a manufacturing equipment provided by the equipment vendor 1. The manufacturing equipment 21 includes a processor 211, a communication I/F 212, a product manufacturing unit 213, a log data generator 214, and a data protection apparatus 215.

The processor 211 controls the operation of the manufacturing equipment 21, more specifically, the operation of the components 212 to 214 included in the manufacturing equipment 21. The processor 211 is one or more electronic circuits including a control device and an arithmetic device. The electronic circuit is implemented by an analog or digital circuit or the like. For example, a general-purpose processor, a central processing unit (CPU), a microprocessor, a digital signal processor (DSP), an ASIC, an FPGA, and a combination of these are possible. In addition, the functions of the processor 211 may be executed in these electronic circuits by software. Although details will be described later, the data protection apparatus 215 independently includes a processor, and its operation is controlled by the processor that is different from the processor 211. The communication I/F 212 is a communication interface that communicably connects the manufacturing equipment 21 to the vendor terminal 11. The product manufacturing unit 213 manufactures a predetermined product.

The log data generator 214 generates various types of log data regarding the operation of the manufacturing equipment 21 (product manufacturing unit 213). The various types of log data include, for example, various types of time-series data regarding the manufacturing equipment 21, such as an operation log, a communication log, and a hardware failure log. The operation log includes, for example, time-series data regarding the operating time of the manufacturing equipment 21, time-series data regarding the number of products manufactured per unit time by the manufacturing equipment 21, time-series data regarding the amount of raw material used per unit time by the manufacturing equipment 21, and the like. The log data includes one or more data frames including a plurality of pieces of data.

The log data generated by the log data generator 214 is roughly divided into two types of log data that is normally disclosed to both the equipment vendor 1 and the operator 2 and log data that is not normally disclosed to both the equipment vendor 1 and the operator 2.

The log data normally disclosed to both the equipment vendor 1 and the operator 2 includes, for example, data necessary for operation of a product manufacturing system (operation of a factory), data necessary for quality control of a product manufactured by the product manufacturing unit 213, data necessary at the time of equipment maintenance in a state in which a maintenance contract is concluded in advance between the equipment vendor 1 and the operator 2, and the like. Such log data is data that is normally disclosed, and thus may be referred to as always-on disclosure data. The always-on disclosure data is uploaded to a server on a cloud, for example.

On the other hand, the log data that is not normally disclosed to both the equipment vendor 1 and the operator 2 includes, for example, data that may be required at the time of audit by a third party organization, data that may be required at the time of equipment maintenance in a state in which a maintenance contract is not concluded in advance between the equipment vendor 1 and the operator 2, and the like. Such log data may be referred to as ex post facto disclosure since the log data is data that can be subject to post-disclosure only in the case in which special circumstances such as an audit by a third party organization or a situation requiring equipment maintenance different from normal equipment maintenance occur. The ex post facto disclosure is encrypted by the data protection apparatus 215 and stored in the storage 22 as encrypted data.

Note that what kind of log data corresponds to the always-on disclosure data or the ex post facto disclosure can be arbitrarily determined between the equipment vendor 1 and the operator 2. For example, from the viewpoint of suppressing the outflow of the know-how of both the equipment vendor 1 and the operator 2 to the outside, the minimum data necessary for the operation of the product manufacturing system may be set as the always-on disclosure data, and all the other data may be set as the ex post facto disclosure.

The data protection apparatus 215 is an apparatus that encrypts log data, which is generated by the log data generator 214 and corresponds to ex post facto disclosure, and protects the log data as encrypted data. Preferably, the data protection apparatus 215 acquires authentication in an organization trusted by both the equipment vendor 1 and the operator 2, for example, ISO 15408 authentication. Note that details of the data protection apparatus 215 will be described later, and thus the detailed description will be omitted here.

The storage 22 stores encrypted data encrypted by the data protection apparatus 215. The storage 22 is not a server or the like on the cloud but a storage device managed by the operator 2. The storage 22 may be, for example, a storage that can be connected to a network such as a network attached storage (NAS), or may be a storage that is not possible to be connected to such a network.

The operator terminal 23 is, for example, a PC, a tablet terminal, a smartphone, or the like that can be operated by the operator 2. The operator terminal 23 is communicably connected to the vendor terminal 11 via the second network Nw2.

The operator terminal 23 includes a processor 231, a communication I/F 232, and a storage 233. The processor 231 is a processor that controls the operation of the operator terminal 23. The communication I/F 232 is a communication interface that communicably connects the operator terminal 23 to the vendor terminal 11. In the storage 233, an operator private key used for digital signature described later is stored at the start of system operation.

Referring to FIG. 3, a detailed configuration of the data protection apparatus 215 will be described. FIG. 3 is a diagram illustrating a configuration example of the data protection apparatus 215 according to the present embodiment.

As illustrated in FIG. 3, the data protection apparatus 215 includes a processor 215A and a storage 215B. The processor 215A implements the functions of the data protection apparatus 215. To the processor 215A, a device similar to the device described in the processor 211 is applicable (not necessarily the same device), and the function may be executed by software. Examples of the functions of the data protection apparatus 215 include an initial key generation function 215a, a key sequence generation function 215b, a log data encryption function 215c, and an encrypted data disclosure control function 215d. These functions are implemented, for example, by the processor 215A executing an encryption program (i.e., software) under an environment in which both the equipment vendor 1 and the operator 2 are not possible to operate (e.g., Intel (registered trademark) SGX, AMD (registered trademark) SEV, and the like). However, the functions described above may be implemented by hardware that is not possible to be operated by either the equipment vendor 1 or the operator 2, or may be implemented by a combination of software and hardware.

Next, the initial key generation function 215a, the key sequence generation function 215b, the log data encryption function 215c, and the encrypted data disclosure control function 215d of the data protection apparatus 215 implemented by the processor 215A will be described in order.

The initial key generation function 215a is a function corresponding to an authentic random number generator, and generates two initial keys for each data frame to be encrypted. Although details will be described later, one of the two initial keys is an initial key (hereinafter, referred to as a forward initial key) for generating a forward key sequence including a plurality of encryption keys (hereinafter, referred to as a forward encryption key) generated in a forward direction to a time sequence (i.e., the data input order) of a plurality of pieces of data included in a data frame to be encrypted. For example, the data $D\_0$ is encrypted by the initial key $Kf\_0$ included in the forward key sequence $Kf$. In addition, the data $D\_n-1$ is encrypted by the encryption key $Kf\_n-1$ included in the forward key sequence $Kf$. The other of the two initial keys is an initial key (hereinafter, referred to as a backward initial key) for generating a backward key sequence including a plurality of encryption keys (hereinafter, referred to as a backward encryption key) generated in a backward direction to a time sequence of a plurality of pieces of data included in a data frame to be encrypted. In the encryption using the backward key sequence $Kr$, the encryption key $Kr\_n-1$ included in the backward key sequence $Kr$ is used for encryption using the above-described encrypted data $Enc(Kf\_0, D\_0)$ as input data. The data $Enc(Kf\_n-1, D\_n-1)$ is encrypted by the initial key $Kr\_0$ included in the backward key sequence $Kr$. The two initial keys generated by the initial key generation function 215a are stored in the storage 215B in the data protection apparatus 215.

The key sequence generation function 215b generates two key sequences based on the two initial keys generated by the initial key generation function 215a and the one-way function.

More specifically, the key sequence generation function 215b generates a plurality of encryption keys in the forward direction to the time sequence of a plurality of pieces of data included in the data frame to be encrypted based on the forward initial key generated by the initial key generation function 215a and the one-way function, and generates a forward key sequence including the forward initial key and the encryption keys (i.e., a plurality of forward encryption keys). The forward initial key may be referred to as a first initial key. The forward encryption key may be referred to as a first encryption key. The forward key sequence may be referred to as a first key sequence.

In addition, the key sequence generation function 215b generates a plurality of encryption keys in the backward direction to the time sequence of a plurality of pieces of data included in the data frame to be encrypted based on the backward initial key generated by the initial key generation function 215a and the one-way function, and generates a backward key sequence including the backward initial key and the encryption keys (i.e., a plurality of backward encryption keys). The backward initial key may be referred to as a second initial key. The backward encryption key may be referred to as a second encryption key. The backward key sequence may be referred to as a second key sequence.

Note that the number of encryption keys including the initial key included in the forward key sequence and the number of encryption keys including the initial key included in the backward key sequence are the same as the number of pieces of data included in the data frame to be encrypted.

The log data encryption function 215c encrypts each of the pieces of data included in the data frame to be encrypted with a corresponding encryption key among the encryption keys included in the forward key sequence. In addition, the log data encryption function 215c further encrypts each piece of encrypted data encrypted with the forward key sequence with a corresponding encryption key among a plurality of encryption keys included in the backward key sequence. That is, the log data encryption function 215c performs multiplex encryption using the encryption key included in the forward key sequence and the encryption key included in the backward key sequence to each of the pieces of data included in the data frame to be encrypted. The encrypted data encrypted by the log data encryption function 215c is stored in the storage 22 outside the data protection apparatus 215. Note that the order of encryption by the forward key sequence and encryption by the backward encryption may be replaced.

In the case in which an agreement to disclose encrypted data included in a predetermined section among a plurality of pieces of encrypted data included in an encrypted data sequence is established in human-related negotiation between the equipment vendor 1 and the operator 2, the encrypted data disclosure control function 215*d* receives an input of a disclosure request message, which is transmitted from the operator terminal 23 and to which the digital signature of the equipment vendor 1 and the digital signature of the operator 2 are attached.

Here, a data configuration of the disclosure request message will be described with reference to FIG. 4.

As illustrated in FIG. 4, a disclosure request message 301 includes a data frame identifier 301-1 and disclosure section information 301-2. The data frame identifier 301-1 is information that uniquely specifies a data frame corresponding to an encrypted data sequence including a predetermined section (data disclosure section) in which disclosure of data is requested. The data frame identifier 301-1 is generated by, for example, combining an identifier that identifies the data protection apparatus 215, a field name of the data frame, a start time of the data frame, and an end time of the data frame. The disclosure section information 301-2 is information including a data number indicating data corresponding to the start position of the data disclosure section and a data number indicating data corresponding to the end position of the data disclosure section. The data disclosure section can be arbitrarily determined in human-related negotiation between the equipment vendor 1 and the operator 2 performed at an arbitrary timing after the system operation. As described above, the start request message 301 can be attached with the digital signature of the equipment vendor 1 or the digital signature of the operator 2.

The description returns to FIG. 3 again. Upon receiving the input of the disclosure request message 301 to which the digital signature of the equipment vendor 1 and the digital signature of the operator 2 are attached, the encrypted data disclosure control function 215*d* confirms the authenticity of the disclosure request message 301 using the vendor public key and the operator public key stored in advance in the storage 215B in the data protection apparatus 215. Signature verification algorithms such as RSA and ECDSA can be used to confirm authenticity. In the case in which it is confirmed that the input disclosure request message 301 is authentic (i.e., in the case in which it is confirmed that the digital signature of the equipment vendor 1 and the digital signature of the operator 2 are authentic), the encrypted data disclosure control function 215*d* calculates the forward encryption key corresponding to the data with the data number indicating the start position of the data disclosure section indicated by the disclosure section information 301-2 of the disclosure request message 301, based on the forward initial key and the one-way function stored in the storage 215B. In addition, the encrypted data disclosure control function 215*d* calculates the backward encryption key corresponding to the data with the data number indicating the end position of the data disclosure section indicated by the disclosure section information 301-2 of the input disclosure request message 301 based on the backward initial key and the one-way function stored in the storage 215B.

The forward encryption key and the backward encryption key calculated by the encrypted data disclosure function 215*d* are transmitted to the equipment vendor 1 (vendor terminal 11) and the operator 2 (operator terminal 23) ds decryption keys that decrypt the encrypted data included in the data disclosure section. The decryption key is encrypted using the vendor public key stored in the storage 215B and then transmitted to the equipment vendor 1, and is encrypted using the operator public key stored in the storage 215B and then transmitted to the operator 2. Alternatively, the decryption key is transmitted to the equipment vendor 1 using a secure key distribution protocol established between the data protection apparatus 215 and the equipment vendor 1 (vendor terminal 11), and is transmitted to the operator 2 using a secure key distribution protocol established between the data protection apparatus 215 and the operator 2 (operator terminal 23). According to this, it is possible to reduce the risk that the decryption key is leaked to a third party other than the equipment vendor 1 and the operator 2.

Figure 5:
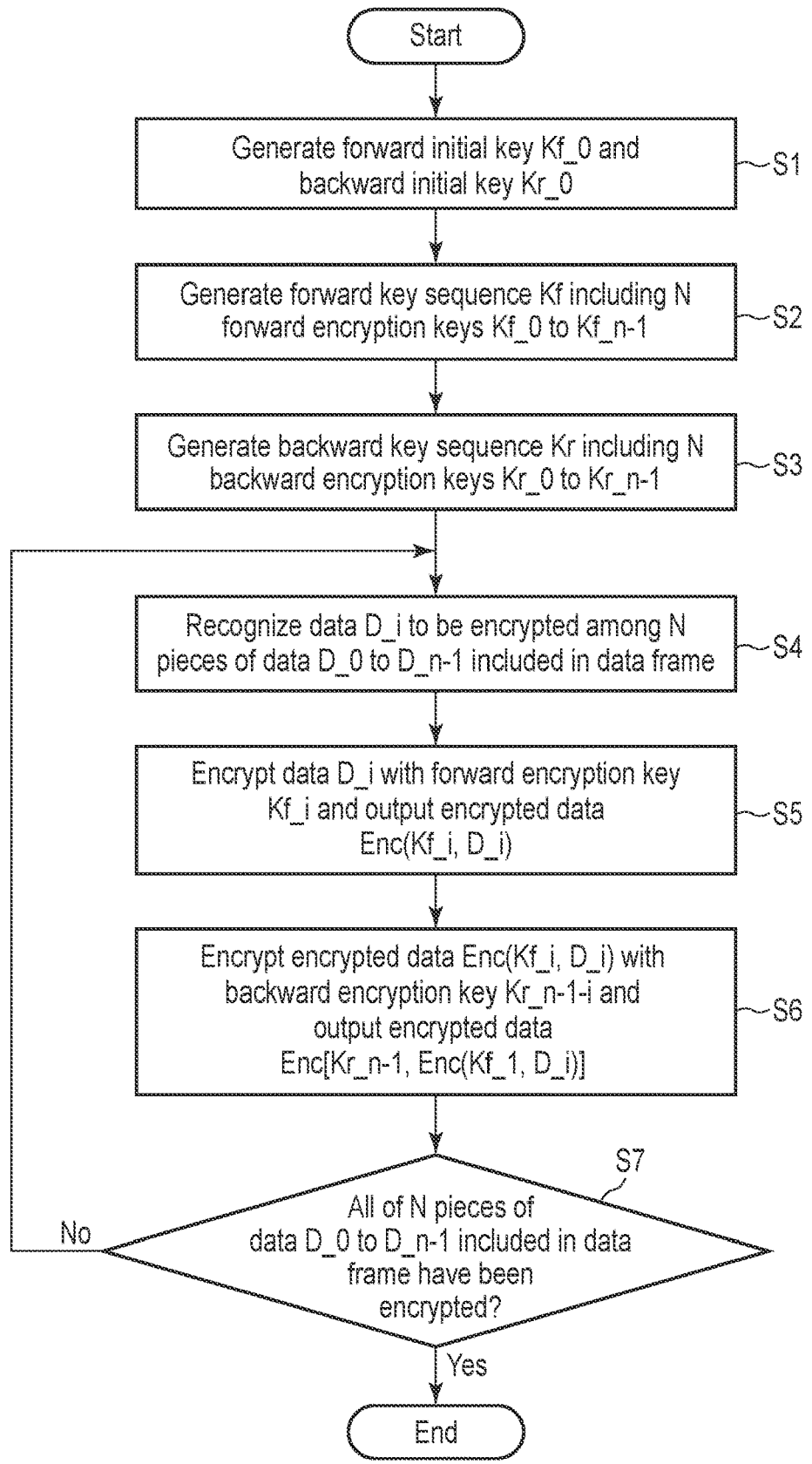
FIG. 5 is a flowchart illustrating a procedure of an encryption process executed by the data protection apparatus according to the embodiment.

Next, the encryption process executed by the processor 215A of the data protection apparatus 215 will be described with reference to a flowchart of FIG. 5. FIG. 5 is a flowchart illustrating a procedure of an encryption process executed by the data protection apparatus 215 according to the present embodiment.

First, the processor 215A of the data protection apparatus 215 generates the forward initial key Kf_0 and the backward initial key Kr_0 as the two initial keys corresponding to the data frame to be encrypted including the N pieces of data D_0 to D_n−1 (step S1).

Subsequently, the processor 215A generates a plurality of forward encryption keys Kf_1 to Kf_n−1 based on the forward initial key Kf_0 generated by the process in step S1 and the one-way function, and generates a forward key sequence Kf including N forward encryption keys Kf_0 to Kf_n−1 including the forward initial key Kf_0 (step S2).

Furthermore, the processor 215A generates a plurality of backward encryption keys Kr_1 to Kr_n−1 based on the backward initial key Kr_0 generated by the process in step S1 and the one-way function, and generates a backward key sequence Kr including N backward encryption keys Kr_0 to Kr_n−1 including the backward initial key Kr_0 (step S3).

Here, the processor 215A recognizes the data D_i as the encryption target (where i is any value of 0 to n−1, and is assumed to increase by one in order from 0) among the N pieces of data D_0 to D_n−1 included in the data frame to be encrypted (step S4).

The processor 215A then encrypts the data D_i recognized as an encryption target by the process in step S4 using the corresponding forward encryption key Kf_i of the forward key sequence Kf and outputs the encrypted data Enc(Kf_i, D_i) (step S5).

In addition, the processor 215A encrypts the encrypted data Enc(Kf_i, D_i) encrypted by the process in step S5 using the corresponding backward encryption key Kr_n−1−i of the backward key sequence Kr and outputs the encrypted data Enc[Kr_n−1−i, Enc(Kf_i, D_i)] (step S6).

After that, the processor 215A determines whether all of the N pieces of data D_0 to D_n−1 included in the data frame to be encrypted have been encrypted (i.e., it is determined whether i=n−1) (step S7). In the case in which it is determined in the process in step S7 that all of the N pieces of data D_0 to D_n−1 have not been encrypted (i.e., when I #n−1) (No in step S7), the processor 215A returns to the process in step S4 described above, recognizes the next data D_i+1 as new data D_i to be encrypted, and then executes the process in step S5 and subsequent steps.

On the other hand, in the process in step S7, in the case in which it is determined that all of the N pieces of data D_0 to D_n−1 have been encrypted (i.e., in the case in which i=n−1) (Yes in step S7), the processor 215A ends the encryption process for the present data frame and starts the encryption process for the next data frame. Since the forward key Kf_i used to encrypt the data D_i can be easily calculated from Kf_i−1 used to encrypt the previous data D_i−1, the forward key sequence does not need to calculate and hold the maximum number N data frames in advance. Unlike the forward direction, the backward key sequence is not possible to be calculated from a key used for previous data encryption. However, it is not always necessary to calculate all the maximum number of N data frames in advance, and it is possible to save the capacity of the storage 215B by performing pre-calculation only for the number corresponding to the log data for one day and calculating the key sequence for the next day at the maintenance time once a day.

Figure 6:
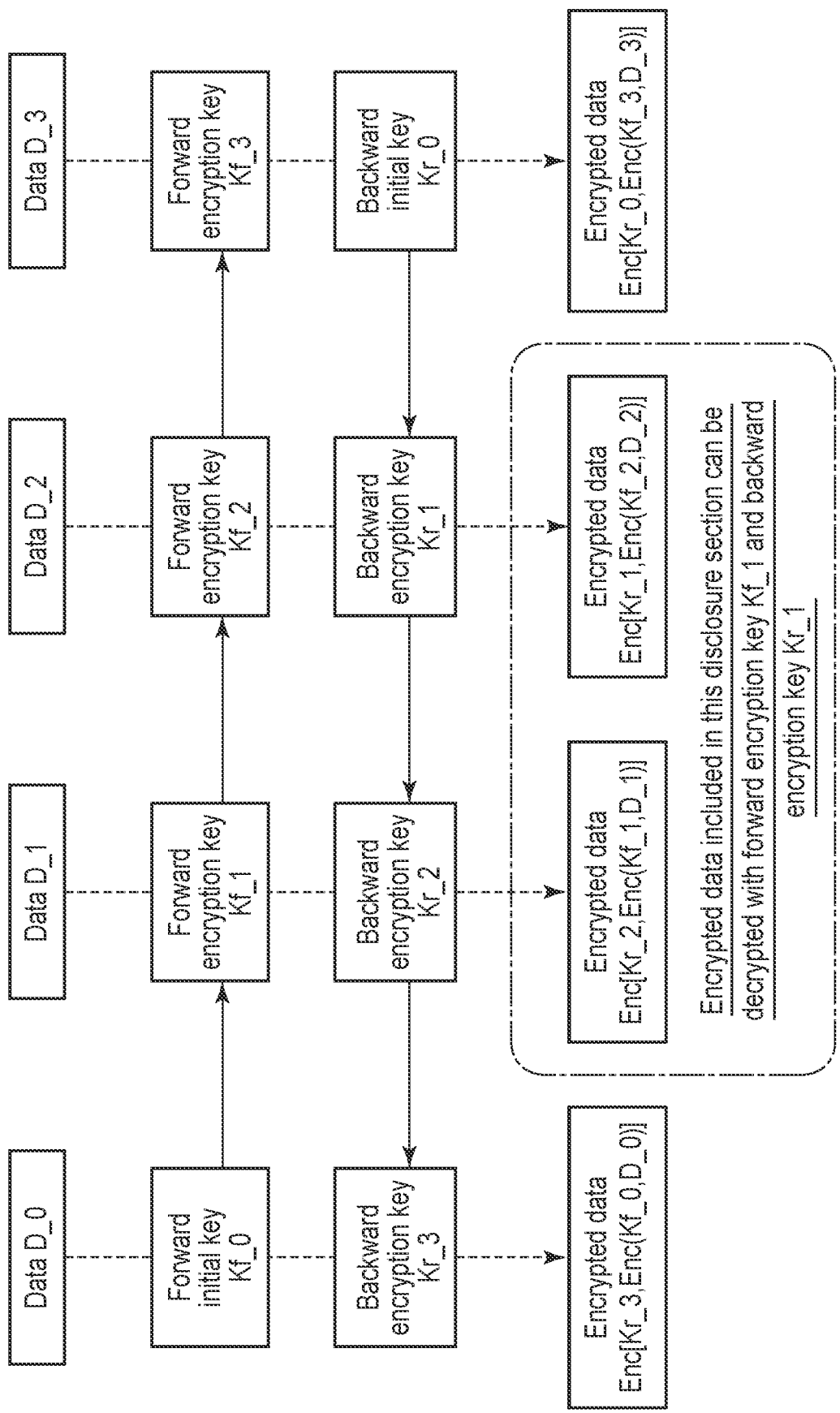
FIG. 6 is a diagram that describes a specific example of an encryption process executed by the data protection apparatus according to the embodiment.

Here, the encryption process executed by the processor 215A of the data protection apparatus 215 will be described more specifically with reference to FIG. 6. FIG. 6 is a diagram that describes a specific example of the encryption process executed by the data protection apparatus 215 according to the present embodiment. Here, it is assumed that the data frame D to be encrypted includes four pieces of data D_0 to D_3.

First, the processor 215A of the data protection apparatus 215 generates the forward initial key Kf_0 and the backward initial key Kr_0 as the two initial keys corresponding to the data frame D to be encrypted including four pieces of data D_0 to D_3.

Subsequently, based on the forward initial key Kf_0 and the one-way function, the processor 215A generates a forward key sequence Kf including four forward encryption keys as many as the number of pieces of data included in the data frame D including the forward initial key Kf_0. More specifically, the processor 215A applies a hash function to the forward initial key Kf_0 to generate the forward encryption key Kf_1, applies a hash function to the forward encryption key Kf_1 to generate the forward encryption key Kf_2, applies a hash function to the forward encryption key Kf_2 to generate the forward encryption key Kf_3, and thus generates the forward key sequence Kf including the four forward encryption keys Kf_0 to Kf_3.

Furthermore, the processor 215A generates a backward key sequence Kr including four backward encryption keys whose number is the same as the number of pieces of data included in the data frame D including the backward initial key Kr_0 based on the backward initial key Kr_0 and the one-way function. More specifically, the processor 215A applies a hash function to the backward initial key Kr_0 to generate the backward encryption key Kr_1, applies a hash function to the backward encryption key Kr_1 to generate the backward encryption key Kr_2, applies a hash function to the backward encryption key Kr_2 to generate the backward encryption key Kr_3, and thus generates the backward key sequence Kr including the four backward encryption keys Kr_0 to Kr_3.

Here, the processor 215A recognizes the data D_0 among the four pieces of data D_0 to D_3 included in the data frame D to be encrypted as an encryption target. The processor 215A encrypts the data D_0 recognized as an encryption target using the corresponding forward encryption key Kf_0 of the forward key sequence Kf, and further encrypts the encrypted data using the corresponding backward encryption key Kr_3 of the backward key sequence Kr. According to this, the data D_0 is output as the encrypted data Enc[Kr_3, Enc(Kf_0, D_0)].

Similarly, the processor 215A encrypts the data D_1 to D_3 with the corresponding forward encryption key of the forward key sequence Kf and the corresponding backward encryption key of the backward key sequence. According to this, the data D_1 is output as the encrypted data Enc[Kr_2, Enc(Kf_1, D_1)]. In addition, the data D_2 is output as encrypted data Enc[Kr_1, Enc(Kf_2, D_2)]. Furthermore, the data D_3 is output as encrypted data Enc[Kr_0, Enc(Kf_3, D_3)].

As described above, the data protection apparatus 215 according to the present embodiment executes the multiplex encryption process using the forward key sequence Kf and the backward key sequence Kr. Although details will be described later, according to such a multiplex encryption process, for example, in the case in which it is desired to decrypt encrypted data corresponding to data included in a predetermined section of a data frame, it is possible to decrypt all the encrypted data included in the predetermined section as long as there are only two encryption keys of a forward encryption key corresponding to data corresponding to a start position of the predetermined section and a backward encryption key corresponding to data corresponding to an end position of the predetermined section.

Next, a series of processes executed to select and disclose encrypted data included in a predetermined section among a plurality of pieces of encrypted data encrypted by the data protection apparatus 215 will be described with reference to a sequence chart of FIG. 7. FIG. 7 is a sequence chart that describes a series of processes implemented by the data protection apparatus 215 according to the present embodiment, which selectively discloses a part of encrypted data.

Figure 8:
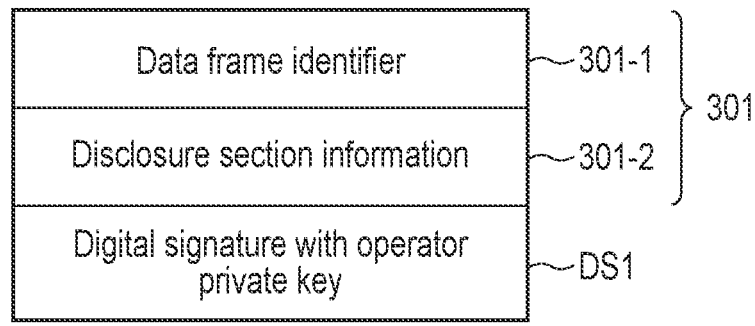
FIG. 8 is a diagram that describes the attachment of the digital signature of an operator to a disclosure request message according to the embodiment.

In the human-related negotiation between the equipment vendor 1 and the operator 2, in the case in which an agreement to disclose the encrypted data included in the predetermined section among the pieces of encrypted data included in the encrypted data sequence is established, the operator terminal 23 generates the disclosure request message 301 including the data frame identifier 301-1 of the data frame corresponding to the encrypted data sequence, and the disclosure section information 301-2 including the data number of the data corresponding to the start position of the predetermined section and the data number of the data corresponding to the end position of the predetermined section. The operator terminal 23 attaches a digital signature using the operator private key stored in the storage 233 to the generated disclosure request message 301 and transmits the message to the vendor terminal 11 (step S1*l*). That is, as illustrated in FIG. 8, the operator terminal 23 transmits d disclosure request message 301 to which a digital signature DS1 (digital signature of the operator 2) using the operator private key is attached to the vendor terminal 11.

Figure 9:
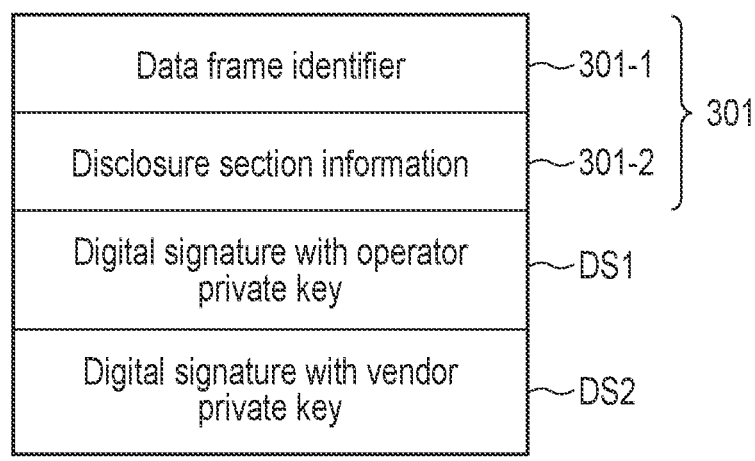
FIG. 9 is a diagram that describes the attachment of an operator digital signature and an equipment vendor digital signature to a disclosure request message according to the embodiment.

When the vendor terminal 11 receives the disclosure request message 301 transmitted from the operator terminal 23 and the equipment vendor 1 confirms that there is no problem in the content of the received disclosure request message 301, the vendor terminal 11 further attaches a digital signature to the disclosure request message 301 using the vendor private key stored in the storage 113 and returns the disclosure request message 301 to the operator terminal 23 (step S12). That is, as illustrated in FIG. 9, the vendor terminal 11 returns, to the operator terminal 23, the disclosure request message 301 attached with the digital signature DS1 (digital signature of the operator 2) by the operator private key and the digital signature DS2 (digital signature of the equipment vendor 1) by the vendor private key.

Note that, here, the case will be described in which the equipment vendor 1 and the operator 2 perform the multiple signature on the disclosure request message 301. However, the disclosure request message 301 is not limited to this, and a group signature by the equipment vendor 1 and the operator 2 may be attached to the disclosure request message. In this case, a common group private key is stored in the storage 113 of the vendor terminal 11 and the storage 233 of the operator terminal 23 before the system operation is started, and each of the equipment vendor 1 and the operator 2 performs the group signature on the disclosure request message 301 using the group private key.

Upon receiving the disclosure request message 301 transmitted from the vendor terminal 11, the operator terminal 23 inputs the received disclosure request message 301 to the data protection apparatus 215 (step S13).

Upon receiving the input of the disclosure request message 301 attached with the digital signature DS1 by the operator private key and the digital signature DS2 by the vendor private key, the processor 215A of the data protection apparatus 215 confirms the authenticity of the digital signature DS1 by the operator private key using the operator public key stored in advance in the storage 215B, and confirms the authenticity of the digital signature DS2 by the vendor private key using the vendor public key stored in advance in the storage 215B (step S14).

In the case in which it is confirmed that both the digital signatures attached to the disclosure request message 301 are authentic, the processor 215A generates a decryption key that decrypts the encrypted data included in the data disclosure section indicated by the disclosure section information 301-2 of the disclosure request message 301. Specifically, the processor 215A calculates the forward encryption key corresponding to the data with the data number indicating the start position of the data disclosure section indicated by the disclosure section information 301-2 of the disclosure request message 301 based on the forward initial key and the one-way function stored in the storage 215B. In addition, the processor 215A calculates a backward encryption key corresponding to the data with the data number indicating the end position of the data disclosure section indicated by the disclosure section information 301-2 of the disclosure request message 301 based on the backward initial key and the one-way function stored in the storage 215B. The processor 215A uses the forward encryption key obtained by the above-described calculation and the backward encryption key obtained by the above-described calculation as decryption keys (step S15).

After that, the processor 215A transmits the decryption keys generated by the process in step S15 to the vendor terminal 11 and the operator terminal 23. In addition, the processor 215A transmits the encrypted data included in the data disclosure section indicated by the disclosure section information 301-2 of the disclosure request message 301 to the vendor terminal 11 and the operator terminal 23 (step S16).

As described above, since the data protection apparatus 215 according to the present embodiment has the initial key generation function 215a, the key sequence generation function 215b, the log data encryption function 215c, and the encrypted data disclosure control function 215d implemented by the processor 215A, it is possible to execute the encryption process capable of selectively decrypting the encrypted data included in the data disclosure section in which both the equipment vendor 1 and the operator 2 have agreed to disclose among the pieces of encrypted data included in the log data (ex post facto disclosure) that is not normally disclosed to both the equipment vendor 1 and the operator 2.

According to this, for example, it is possible to flexibly cope with the case in which the disclosure of the log data is required after the system operation, such as the case in which a defective product is mixed in a product manufactured by the manufacturing equipment 21 and the disclosure of the log data is required from a provider (third party) of the product, or the case in which the disclosure of the log data is required by an audit performed when there arises a suspicion that the quality of the product manufactured by the manufacturing equipment 21 does not reach a standard specified by law. That is, even though various rules regarding the handling of the log data are not determined between the equipment vendor 1 and the operator 2 before the system operation, it is possible to cope with the audit and the like by the third party organization, and it is possible to smoothly perform the contract regarding the system operation exchanged between the equipment vendor 1 and the operator 2.

In addition, since the data protection apparatus 215 according to the present embodiment encrypts the log data by common key encryption in which an encryption key is also used as a decryption key, for example, a processing load is small as compared with encryption by ciphertext-policy attribute-based encryption (CP-ABE) or the like in which an attribute of a member who can decrypt and browse the encrypted data can be managed for each data, and it is possible to perform the encryption processing at high speed.

Furthermore, when two initial keys are held for one encrypted data frame, the data protection apparatus 215 according to the present embodiment can generate decryption keys corresponding to all encrypted data included in the data frame.

In addition, the data protection apparatus 215 according to the present embodiment stores encrypted data in the storage 22 outside the data protection apparatus 215. Generally, the log data is indefinite length data generated frequently, and the data size tends to increase. For this reason, an encryption apparatus that encrypts such log data usually requires a large-capacity storage, and the cost for implementing the encryption apparatus tends to increase. However, the data protection apparatus 215 according to the present embodiment only has to store the encrypted data that has been encrypted in the storage 22 outside the data protection apparatus 215 and store two initial keys for one encrypted data frame in the storage 215B in the apparatus. Therefore, it is possible to reduce the cost necessary for mounting the data protection apparatus 215 without requiring a large-capacity storage.

As described above, in the storage 215B of the data protection apparatus 215 according to the present embodiment, two initial keys are stored for one encrypted data frame, and the data size of data managed for confidentiality by the data protection apparatus 215 can be suppressed low. Therefore, garbage collection performed in the case of managing large-capacity data can be eliminated, and a processing load on the data protection apparatus 215 can be reduced. According to this, it is possible to improve the real-time property of the encryption process executed by the data protection apparatus 215.

Furthermore, the data protection apparatus 215 according to the present embodiment is provided in the manufacturing equipment 21 and implements the above-described various functions 215a to 215d by the unique processor 215A different from the processor 211 of the manufacturing equipment 21, unlike an apparatus that implements various functions by a program stored in a server on a cloud, and thus it is possible to operate locally the apparatus with no dependence on a communication environment.

In the embodiment described above, the case in which the data protection apparatus 215 copes with the audit and the like by the third party organization, i.e., the case in which a part of the log data (ex post facto disclosure data) which is not normally disclosed to both the equipment vendor 1 and the operator 2 is disclosed to the third party has been described. However, the data protection apparatus 215 can also disclose a part of the log data which is normally disclosed to the equipment vendor 1 and is not normally disclosed to the operator 2 to the operator 2.

The log data that is normally disclosed to the equipment vendor 1 and is not normally disclosed to the operator 2 includes, for example, data necessary for preventive maintenance by the equipment vendor 1. Such log data is data that is normally disclosed to a specific person who performs preventive maintenance (equipment vendor 1), and thus may be referred to as specific disclosure data. Note that what kind of log data corresponds to the always-on disclosure data, the ex post facto disclosure, and the specific disclosure data can be arbitrarily determined between the equipment vendor 1 and the operator 2.

The preventative maintenance is a maintenance method in which the equipment vendor 1 collects log data regarding the equipment maintenance in real time under d maintenance contract with the operator 2, analyzes the log data to detect a failure symptom that may occur in the manufacturing equipment 21, and performs the equipment maintenance before the manufacturing equipment 21 fails, and thus the failure of the manufacturing equipment 21 is prevented in advance.

The data protection apparatus 215 encrypts the data frame included in the log data corresponding to the specific disclosure data by the encryption process illustrated in FIGS. 5 and 6. However, in the preventive maintenance, the equipment vendor 1 has to collect the encrypted data frame (encrypted data series), which is the data frame included in the log data corresponding to the specific disclosure data, and sequentially decrypt the data frame. Therefore, the data protection apparatus 215 transmits the two initial keys corresponding to the encrypted data frame to the equipment vendor 1 (vendor terminal 11) at the time point at which the data frame included in the log data corresponding to the specific disclosure data is encrypted. According to this, the equipment vendor 1 can independently generate the forward key sequence and the backward key sequence based on the two initial keys and the one-way function, and sequentially decrypt the encrypted data frame.

Upon receiving an input of a disclosure request message 301 that requests disclosure of a part of log data corresponding to specific disclosure data and to which a digital signature DS1 by an operator private key is attached from the operator terminal 23 (operator 2), the data protection apparatus 215 confirms authenticity of the disclosure request message 301 using an operator public key stored in advance in the storage 215B. In the case in which it is confirmed that the disclosure request message 301 is authentic (i.e., in the case in which it is confirmed that the digital signature DS1 by the operator private key is authentic), the data protection apparatus 215 generates a forward encryption key corresponding to the data with the data number indicating the start position of the data disclosure section indicated by the disclosure section information 301-2 of the disclosure request message 301 and a backward encryption key corresponding to the data with the data number indicating the end position of the data disclosure section as decryption keys, and transmits the generated decryption keys to the operator terminal 23.

According to this, the operator 2 can confirm whether the equipment vendor 1 does not illegally collect log data other than the log data corresponding to the specific disclosure data necessary for the preventive maintenance. That is, the data protection apparatus 215 according to the present embodiment can cope with not only the audit by the third-party organization described above but also the sampling inspection by the operator 2. Therefore, the data protection apparatus 215 according to the present embodiment can also function as a deterrent to prevent unauthorized collection of log data by the equipment vendor 1.

However, the log data corresponding to the specific disclosure data includes the know-how of the equipment vendor 1 such as know-how for detecting a failure symptom and know-how regarding the manufacturing equipment 21, and from the viewpoint of protecting the know-how of the equipment vendor 1, it is desirable that the data size of the data included in the data disclosure section and the number of pieces of data included in the data disclosure section are limited. In addition, it is desirable to limit unnecessary disclosure requests by the operator 2.

As a method of setting a limit to the data size of the data included in the data disclosure section and the number of pieces of data included in the data disclosure section, for example, there is a method of requiring digital signatures of both the equipment vendor 1 and the operator 2 in order to disclose a part of the log data corresponding to the specific disclosure data. According to this, the equipment vendor 1 can confirm the data size of the data included in the data disclosure section requested by the operator 2 and the number of pieces of data included in the data disclosure section, and in the case in which the data size and the number of pieces of data are excessively requested, the equipment vendor 1 can reject the disclosure request from the operator 2 by not performing the digital signature.

Another method of setting a limit on the data size of the data included in the data disclosure section and the number of pieces of data included in the data disclosure section is a method of setting a limit on the data size and the number of pieces of data in the data protection apparatus 215 in advance under an agreement between the equipment vendor 1 and the operator 2. In this case, the digital signature necessary to disclose a part of the log data corresponding to the specific disclosure data is the digital signature of the operator 2. According to this, in the data protection apparatus 215, it is possible to confirm whether the data size of the data included in the data disclosure section requested by the operator 2 and the number of pieces of data included in the data disclosure section exceed the preset limit.

Note that which of the two methods described above is used can be arbitrarily determined by the equipment vendor 1 and the operator 2.

In the present embodiment described above, the data protection apparatus 215 generates the encryption keys such that the number of encryption keys including the initial key included in the key sequence is the same as the number of pieces of data included in the data frame to be encrypted. However, the present invention is not limited to this, and the data protection apparatus 215 may generate the encryption keys such that the number of encryption keys not including the initial key included in the key sequence is the same as the number of pieces of data included in the data frame to be encrypted. In this case, the data protection apparatus 215 encrypts the data included in the data frame to be encrypted using an encryption key other than the initial key without using the initial key.

Heretofore, the data protection apparatus 215 capable of executing an encryption process that is capable of selectively decrypting data included in a predetermined section among a large number of pieces of data included in log data has been described. Hereinafter, the case in which such a data protection apparatus 215 further has a falsification verification support function that supports falsification verification of encrypted data will be described.

Figure 10:
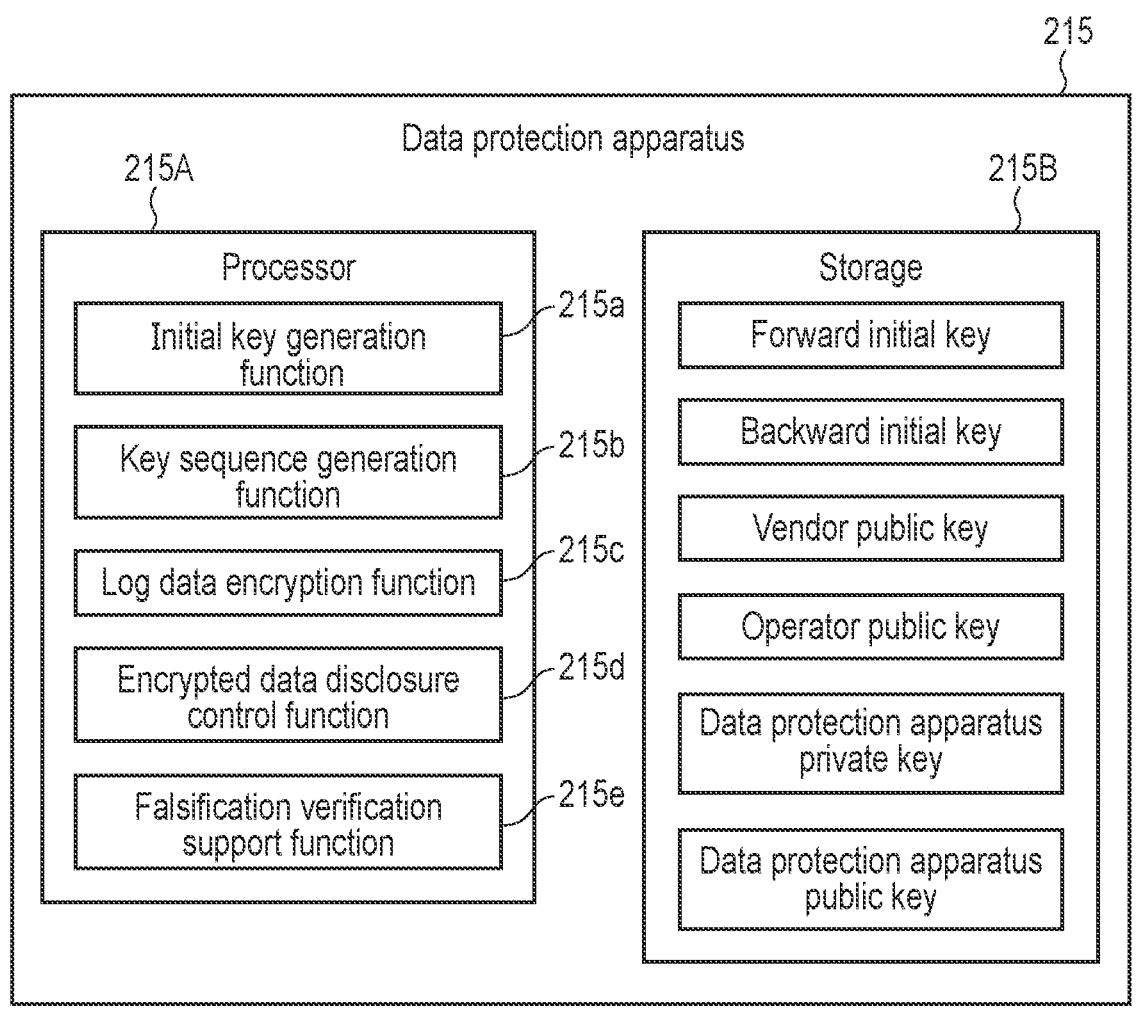
FIG. 10 illustrates a configuration example of a data protection apparatus according to the embodiment.

FIG. 10 is a diagram illustrating a configuration example of the data protection apparatus 215 according to the present embodiment. The data protection apparatus 215 illustrated in FIG. 10 is different from the configuration illustrated in FIG. 3 in that the data protection apparatus 215 further includes a falsification verification support function 215e as a function implemented by the processor 215A. In addition, the data protection apparatus 215 illustrated in FIG. 10 is different from the configuration illustrated in FIG. 3 in that a public key pair of a data protection apparatus private key used for digital signature, described later, and a data protection apparatus public key, which is a pair of the data protection apparatus private key, is further stored in the storage 215B. The data protection apparatus public key is also distributed in advance to the vendor terminal 11 and the operator terminal 23, and is stored in advance in the storage of each terminal.

It is assumed that the public key pair of the data protection apparatus private key and the data protection apparatus public key is generated when the data protection apparatus 215 is manufactured by the equipment vendor 1, and a digital certificate in the X. 509 format for guaranteeing the correspondence between the data protection apparatus 215 and the data protection apparatus public key is issued to the public key pair by a certificate authority (CA).

The falsification verification support function 215e generates a data frame signature issued to the entire predetermined data frame and a data section signature issued to a predetermined data disclosure section.

Here, a data configuration example of the data frame signature generated by the falsification verification support function 215e will be described with reference to FIG. 11.

As illustrated in FIG. 11, a data frame signature 302 is information including a data frame identifier 302-1 of a data frame to which the data frame signature is issued, a hash value 302-2 (i.e., the plaintext hash value) of the entire data frame, a hash value 302-3 (i.e., the ciphertext hash value) of the entire encrypted data sequence corresponding to the data frame, and a digital signature 302-4 (digital signature of the data protection apparatus 215) using the data protection apparatus private key.

The hash value 302-2 of the entire data frame is calculated by applying a hash function to each of the N pieces of data D_0 to D_n−1 included in the data frame. The hash value 302-3 of the entire encrypted data sequence is calculated by applying a hash function to each of N pieces of encrypted data encrypted by the encryption processing illustrated in FIG. 5. The digital signature 302-4 using the data protection apparatus private key is generated using the data protection apparatus private key stored in the storage 215B. Note that the data frame identifier 302-1 is similar to the data frame identifier 301-1 illustrated in FIG. 4, and thus the detailed description will be omitted here.

When all the N pieces of data included in the data frame to be encrypted are encrypted by the encryption processing illustrated in FIG. 5, the falsification verification support function 215e generates the data frame signature 302 for the data frame. The generated data frame signature 302 is output to the operator terminal 23 and is managed by the operator 2, for example, stored in the storage 233.

Note that the falsification verification support function 215e may record the generated data frame signature 302 in an external blockchain. According to this, it is possible to leave a trail indicating that the data frame corresponding to the data frame signature 302 exists from the time when the data frame signature 302 is recorded in the blockchain. In addition, since the blockchain is excellent in falsification resistance, by recording the generated data frame signature 302 in the blockchain, it is also possible to improve falsification resistance and enhance credibility of an audit by a third party organization.

Next, a data configuration example of the data section signature generated by the falsification verification support function 215e will be described with reference to FIG. 12.

As illustrated in FIG. 12, a data section signature 303 is information including a data frame identifier 303-1 of a data frame including a data disclosure section to which the data section signature is issued, a hash value 303-2 (i.e., the plaintext hash value) of data included in the data disclosure section, a hash value 303-3 (i.e., the ciphertext hash value) of encrypted data included in the data disclosure section, disclosure section information 303-4 indicating the data disclosure section, and a digital signature 303-5 (digital signature of the data protection apparatus 215) using a data protection apparatus private key.

The hash value 303-2 of the data included in the data disclosure section is calculated by applying a hash function to each of one or more pieces of data included in the data disclosure section. The hash value 303-3 of the encrypted data included in the data disclosure section is calculated by applying a hash function to each of one or more pieces of encrypted data corresponding to one or more pieces of data included in the data disclosure section. The digital signature 303-5 using the data protection apparatus private key is generated using the data protection apparatus private key stored in the storage 215B. Note that the data frame identifier 303-1 is similar to the data frame identifier 301-1 illustrated in FIG. 4, and thus the detailed description will be omitted here. Since the disclosure section information 303-4 is also similar to the disclosure section information 301-2 illustrated in FIG. 4, the detailed description will be omitted here. However, the disclosure request message 301 itself illustrated in FIG. 4 may be embedded in the disclosure section information 303-4.

When the disclosure request message 301 is input from the operator terminal 23, the falsification verification support function 215e generates the data section signature 303 for a predetermined section of the data frame indicated by the disclosure request message 301.

Figure 13:
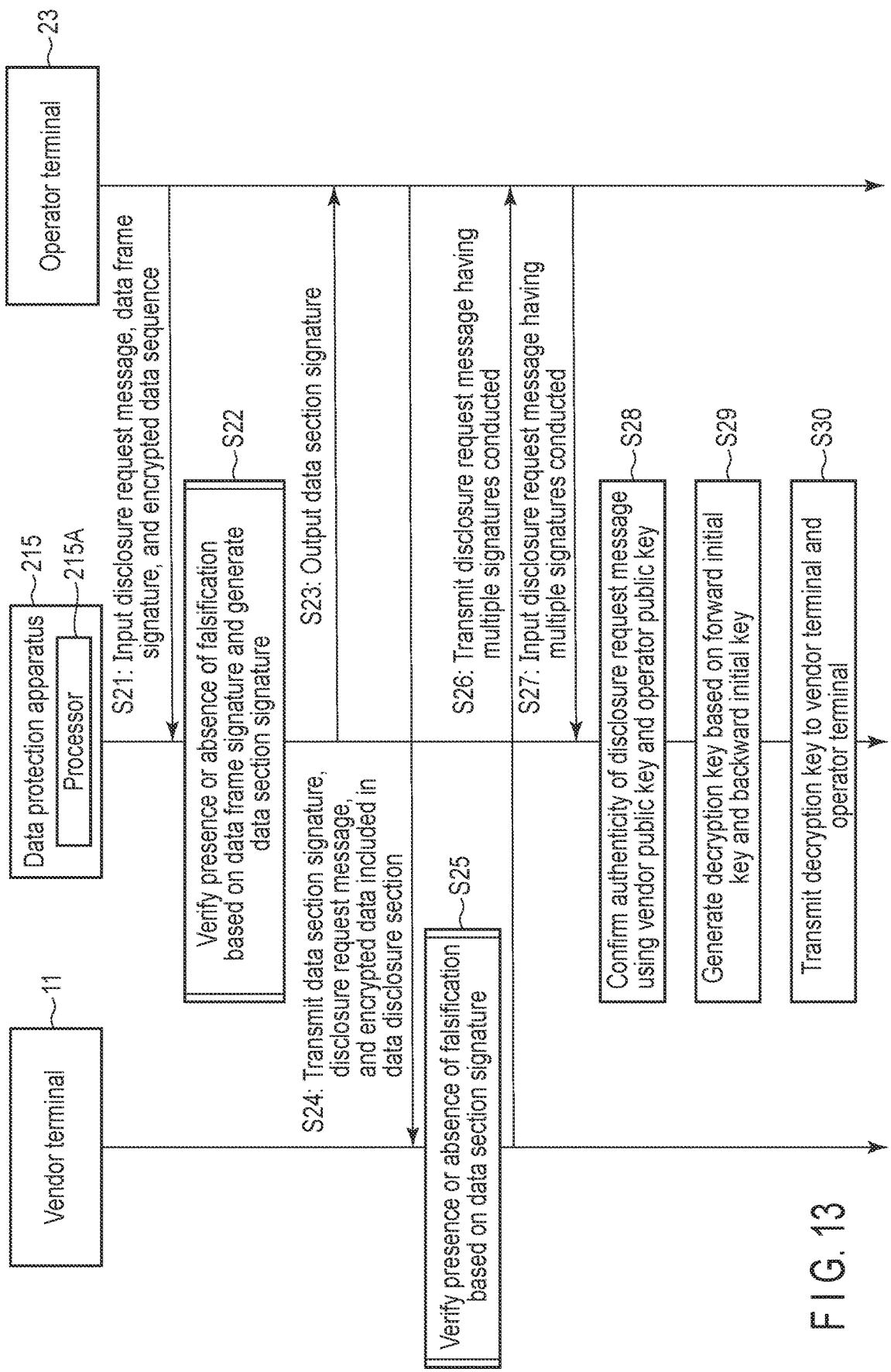
FIG. 13 is a sequence chart that describes a series of processing implemented by the data protection apparatus

Next, a series of processes executed to select and disclose encrypted data included in a predetermined section among a plurality of pieces of encrypted data encrypted by the data protection apparatus 215 will be described with reference to a sequence chart of FIG. 13. The series of processes illustrated in FIG. 13 is different from the series of processes illustrated in FIG. 7 in that not only encrypted data included in a predetermined section is selected and disclosed but also falsification verification of a data frame corresponding to the encrypted data, an encrypted data sequence including the encrypted data, and the encrypted data is performed.

First, the operator terminal 23 generates a disclosure request message 301 to request disclosure of encrypted data included in a predetermined section among a plurality of pieces of encrypted data included in a predetermined encrypted data sequence. Similarly to the case illustrated in FIG. 8, a digital signature DS1 using the operator private key is attached to the generated disclosure request message 301.

The operator terminal 23 inputs the disclosure request message 301 to which the digital signature DS1 by the operator private key is attached, the data frame signature 302 issued in advance to the data frame identified by the data frame identifier 301-1 included in the disclosure request message 301, and the predetermined encrypted data sequence stored in the storage 22 to the data protection apparatus 215 (step S21).

Figure 14:
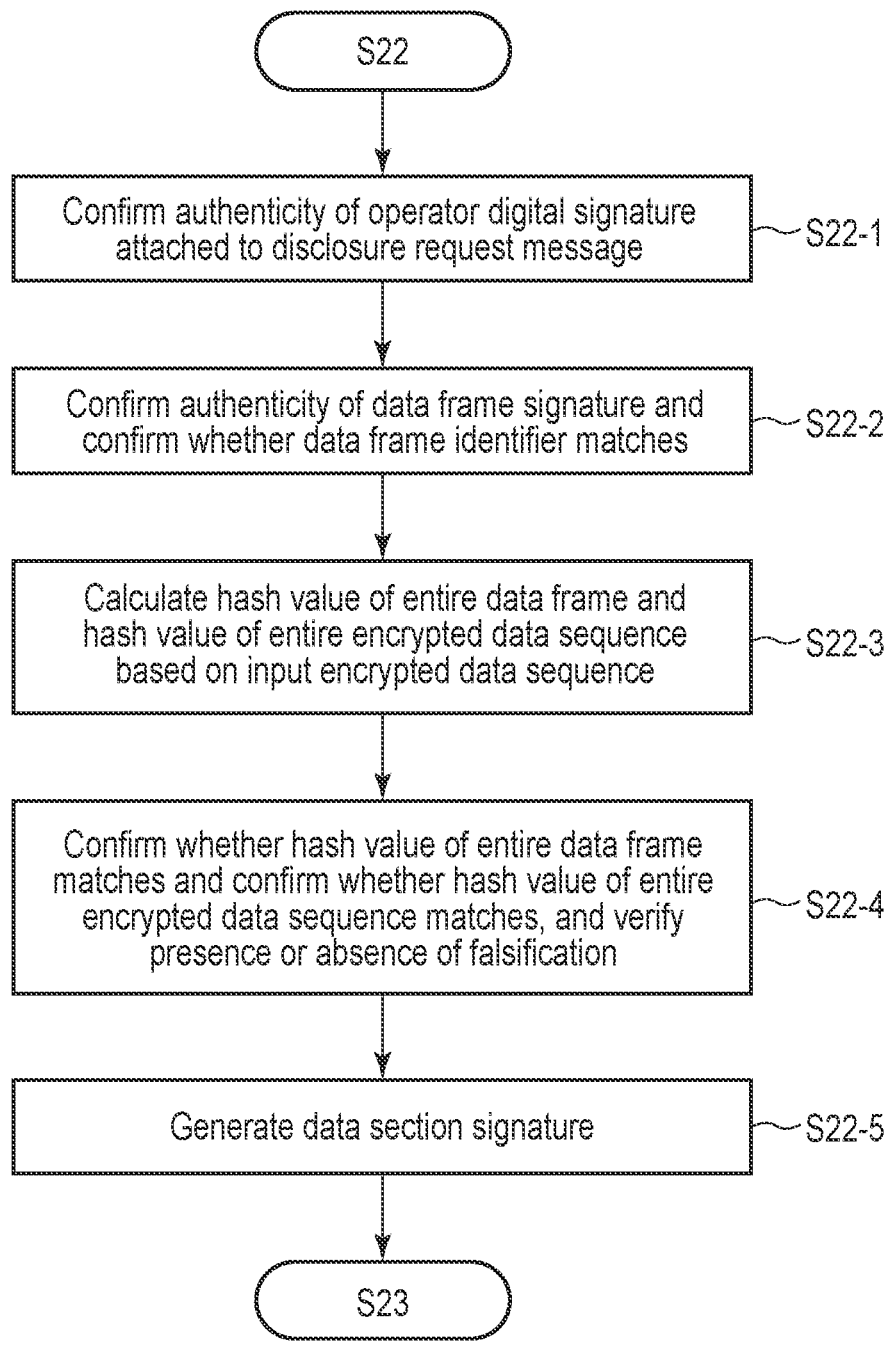
FIG. 14 is a flowchart that describes the process in step S22 in detail illustrated in FIG. 13.

Upon receiving the input of the disclosure request message 301, the data frame signature 302, and the predetermined encrypted data sequence from the operator terminal 23, the processor 215A of the data protection apparatus 215 executes a series of processes illustrated in FIG. 14 (step S22).

FIG. 14 is a flowchart that describes the process in step S22 illustrated in FIG. 13 in more detail.

First, the processor 215A confirms the authenticity of the digital signature DS1 by the operator private key attached to the disclosure request message 301 input from the operator terminal 23 using the operator public key stored in advance in the storage 215B (step S22-1).

In the case in which it is confirmed that the digital signature DS1 by the operator private key attached to the disclosure request message 301 is authentic, the processor 215A uses the data protection apparatus public key stored in advance in the storage 215B to confirm the authenticity of the digital signature 302-4 by the data protection apparatus private key included in the data frame signature 302 input from the operator terminal 23. In addition, in the case in which it is confirmed that the digital signature DS1 by the operator private key attached to the disclosure request message 301 is authentic, the processor 215A confirms whether the data frame identifier 301-1 included in the disclosure request message 301 matches the data frame identifier 302-1 included in the data frame signature 302 (step S22-2).

In the case in which it is confirmed that the digital signature 302-4 based on the data protection apparatus private key included in the data frame signature 302 is authentic, and it is confirmed that the data frame identifier 301-1 included in the disclosure request message 301 matches the data frame identifier 302-1 included in the data frame signature 302, the processor 215A calculates the hash value of the entire data frame and the hash value of the entire encrypted data sequence using the encrypted data sequence input from the operator terminal 23 (step S22-3). Note that the hash value of the entire data frame is calculated by decrypting the data frame from the encrypted data sequence using the forward initial key and the backward initial key stored in the storage 215B.

Subsequently, the processor 215A checks whether the hash value 302-2 of the entire data frame included in the data frame signature 302 matches the hash value of the entire data frame calculated by the process in step S22-3. In addition, the processor 215A checks whether the hash value 302-3 of the entire encrypted data sequence included in the data frame signature 302 matches the hash value of the entire encrypted data sequence calculated by the process in step S22-3 (step S22-4). According to this, it is possible to verify whether the data frame and the encrypted data sequence corresponding to the data frame have been falsified.

In the case in which the hash value 302-2 of the entire data frame included in the data frame signature 302 matches the hash value of the entire data frame calculated by the process in step S22-3, the hash value 302-3 of the entire encrypted data sequence included in the data frame signature 302 matches the hash value of the entire encrypted data sequence calculated by the process in step S22-3, and it is confirmed that the data frame and the encrypted data sequence corresponding to the data frame have not been falsified, the processor 215A generates the data section signature 303 for the data disclosure section indicated by the disclosure section information 301-2 of the disclosure request message 301 input from the operator terminal 23. More specifically, the processor 215A calculates the hash value 303-2 of the data included in the data disclosure section and the hash value 303-3 of the encrypted data included in the data disclosure section, and generates the data section signature 303 in the format illustrated in FIG. 12 (step S22-5).

The description returns to FIG. 13 again. The processor 215A outputs the data section signature 303 generated by the process in step S22-5 to the operator terminal 23 (step S23).

Upon receiving the input of the data section signature 303, the operator terminal 23 transmits the data section signature 303, the disclosure request message 301 to which the digital signature DS1 by the operator private key generated by the process in step S21 is attached, and the encrypted data included in the data disclosure section to the vendor terminal 11 (step S24).

Figure 15:
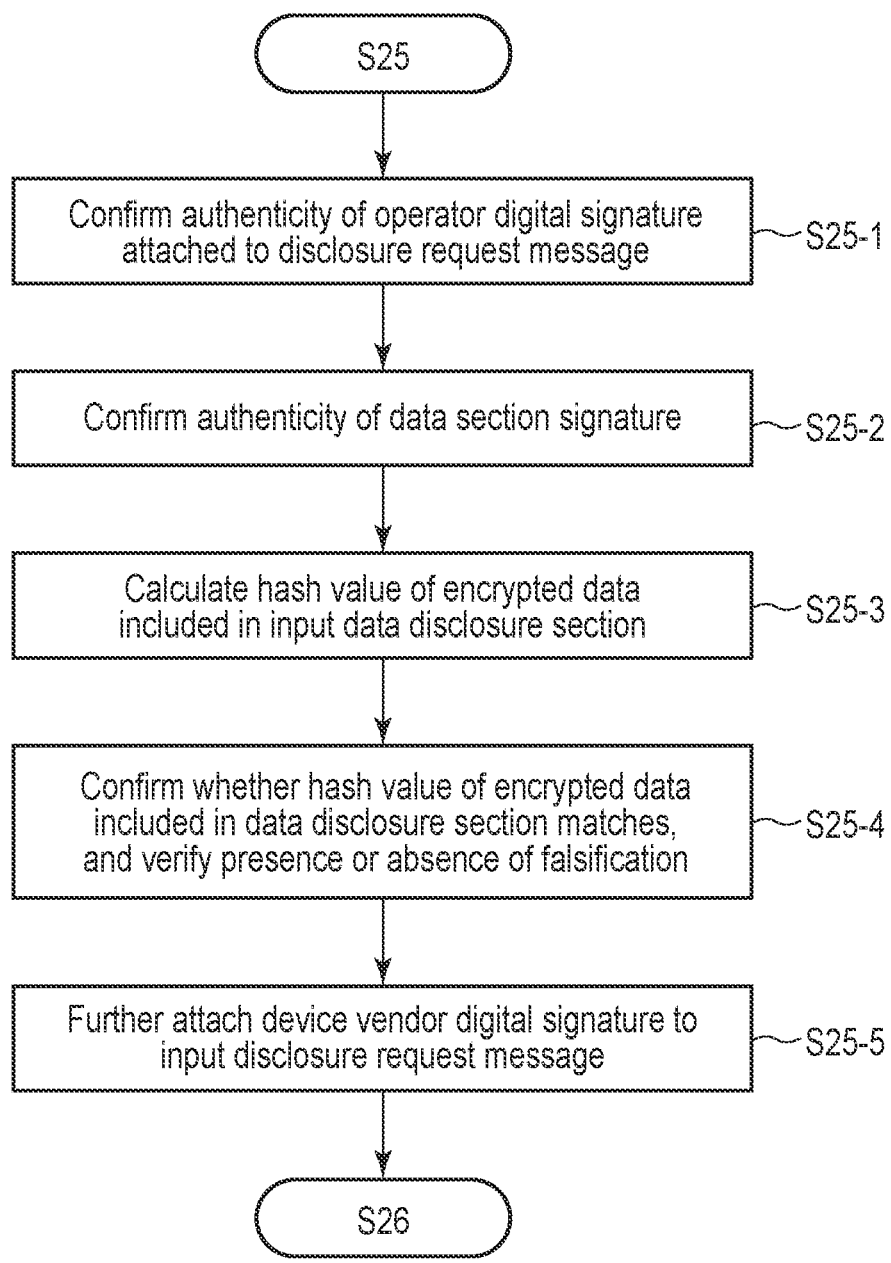
FIG. 15 is a flowchart that describes the process in step S25 in detail illustrated in FIG. 13.

Upon receiving the input of the data section signature 303, the disclosure request message 301, and the encrypted data included in the data disclosure section from the operator terminal 23, the vendor terminal 11 executes a series of processes illustrated in FIG. 15 (step S25).

FIG. 15 is a flowchart that describes the process in step S25 illustrated in FIG. 13 in more detail.

The vendor terminal 11 confirms the authenticity of the digital signature DS1 by the operator private key attached to the disclosure request message 301 input from the operator terminal 23 using the operator public key stored in advance in the storage 113 (step S25-1).

In the case in which it is confirmed that the digital signature DS1 by the operator private key attached to the disclosure request message 301 is authentic, the vendor terminal 11 confirms the authenticity of the digital signature 303-5 by the data protection apparatus private key included in the data section signature 303 input from the operator terminal 23 using the data protection apparatus public key stored in advance in the storage 113 (step S25-2).

In the case in which it is confirmed that the digital signature 303-5 based on the data protection apparatus private key included in the data section signature 303 is authentic, the vendor terminal 11 calculates a hash value of the encrypted data included in the data disclosure section input from the operator terminal 23 (step S25-3).

Subsequently, the vendor terminal 11 checks whether the hash value 303-3 of the encrypted data included in the data disclosure section of the data section signature 303 matches the hash value of the encrypted data included in the data disclosure section calculated by the process in step S25-3 (step S25-4). According to this, it is possible to verify whether the encrypted data included in the data disclosure section has been falsified.

In the case in which it is confirmed that the hash value 303-3 of the encrypted data included in the data disclosure section of the data section signature 303 matches the hash value of the encrypted data included in the data disclosure section calculated by the process in step S25-3 and the encrypted data included in the data disclosure section is not falsified, the vendor terminal 11 executes processing of further adding a digital signature DS2 by the vendor private key to the disclosure request message 301 to which the digital signature DS1 by the operator private key is attached ds illustrated in FIG. 9 (step S25-5).

The description returns to FIG. 13 again. The vendor terminal 11 transmits the disclosure request message 301 (i.e., the disclosure request message 301 to which the multiple signature is applied) further attached with the digital signature DS2 by the vendor private key by the process in step S25-5 to the operator terminal 23 (step S26).

Hereinafter, since the processes in steps S27 to S30 is similar to the processes in steps S13 to S16 illustrated in FIG. 7, the detailed description will be omitted here.

As described above, the data protection apparatus 215 according to the present embodiment further includes the falsification verification support function 215e implemented by the processor 215A, issues the data frame signature 302 for the data frame as the encryption of the data frame is completed, and outputs the data frame signature to the operator terminal 23. When the data frame signature 302 is input from the operator terminal 23, the data protection apparatus 215 can verify whether the data frame and the encrypted data sequence corresponding to the data frame have been falsified using the data frame signature 302. That is, the data protection apparatus 215 does not have to store the hash value for each data frame in the storage 215B in order to verify the presence or absence of the falsification described above, and it is possible to suppress the data size of the data managed by the data protection apparatus 215 to be small, and to achieve cost reduction.

In addition, since the data protection apparatus 215 according to the present embodiment can issue the data frame signature 302 including the hash value 302-3 of the entire encrypted data sequence, it is possible to support falsification verification of the encrypted data sequence. For example, in the case in which a third party organization audits the data management system of the operator 2, the third party organization calculates a hash value of the entire encrypted data sequence provided by the operator 2, and checks whether the hash value matches the hash value 302-3 of the entire encrypted data sequence included in the data frame signature 302, and thus it is possible to audit the data management system of the operator 2. In this case, since the encrypted data sequence is not decrypted, the operator 2 can provide the encrypted data sequence to the third party organization without obtaining the consent of the equipment vendor 1, and can smoothly respond to the audit by the third party organization.

Furthermore, when the disclosure request message 301 is input from the operator terminal 23, the data protection apparatus 215 according to the present embodiment issues the data section signature 303 for the data disclosure section indicated by the disclosure section information 301-2 of the disclosure request message 301, and outputs the data section signature to the operator terminal 23. In addition, the operator terminal 23 transmits the data section signature 303 issued by the data protection apparatus 215, the disclosure request message 301, and the encrypted data included in the data disclosure section to the vendor terminal 11. According to this, the equipment vendor 1 can verify whether the encrypted data provided by the operator 2 is falsified before attaching the digital signature DS2 by the vendor private key to the disclosure request message 301 (i.e., before agreeing to the disclosure of the encrypted data included in the data disclosure section). According to this, it is possible to eliminate the concern of making a fraudulent claim, for example, that the operator 2 intentionally provides the damaged encrypted data to the equipment vendor 1, claiming that "The data has been damaged due to force majeure, and we could not restore the data".

In the series of processes illustrated in FIG. 13, the data protection apparatus 215 transmits the decryption key to the vendor terminal 11 and the operator terminal 23. However, as a method of distributing the decryption key, it is conceivable that the data protection apparatus 215 outputs the decryption key to the operator terminal 23, and the operator terminal 23 further transmits the decryption key to the vendor terminal 11. In the case of such a distribution method of the decryption key, for example, there may be the case in which the equipment vendor 1 fails to obtain the decryption key, such as the case in which a communication failure occurs between the equipment vendor 1 and the operator 2 and the decryption key fails to be normally transmitted, or the case in which the operator 2 does not intentionally transmit the decryption key to the equipment vendor 1.

However, in the present embodiment, since the equipment vendor 1 holds the disclosure request message 301 to which the digital signature DS1 by the operator private key and the digital signature DS2 by the vendor private key are attached and the data section signature 303 at the time when the process in step S26 illustrated in FIG. 13 is executed, it is possible to prove to a third party that there is an agreement between the equipment vendor 1 and the operator 2 regarding the disclosure of the encrypted data included in the predetermined section (the third party verifies that there is the agreement described above). Therefore, the equipment vendor 1 can request the operator 2 to reissue the decryption key, execute the series of processes illustrated in FIG. 13 again, and receive the reissued decryption key. Even though the operator 2 refuses the decryption key reissue processing, it is possible to request (force) contract performance through a third party.

In FIG. 13, it is assumed that the encrypted data series is not disclosed to both the equipment vendor 1 and the operator 2. However, the present embodiment is also applicable to, for example, the case in which preventive maintenance is performed by the equipment vendor 1, i.e., the case in which the encrypted data series (specific disclosure data) is normally disclosed to the equipment vendor 1 and is not normally disclosed to the operator 2.

In the case in which the encrypted data sequence (specific disclosure data) is normally disclosed to the equipment vendor 1 for preventive maintenance, the equipment vendor 1 has the forward initial key and the backward initial key, and thus, it is possible to forge (fabricate) the encrypted data that can obtain a decryption result in a normal data format. Even though an encryption scheme having falsification verification capability such as AES-CCM or AES-GCM is used, since the equipment vendor 1 has a correct private key, data passing through falsification verification of AES-CCM or AES-GCM can be forged for individual data. However, since the data frame signature 302 is issued, even though the data is forged (fabricated) by the equipment vendor 1, the forgery of the data can be detected using the hash value 302-2 of the entire data frame and the hash value 302-3 of the entire encrypted data sequence included in the data frame signature 302.

In addition, after both the equipment vendor 1 and the operator 2 are given the decryption key that decrypts the predetermined encrypted data sequence, both the equipment vendor 1 and the operator 2 can forge the data described above. However, as in the case described above, since it is possible to detect data counterfeiting using the hash value 302-2 of the entire data frame and the hash value 302-3 of the entire encrypted data sequence included in the data frame signature 302, it is possible to prevent the data from being forged.

Note that the falsification verification support function 215e is also applicable to the case in which an encrypted data series (specific disclosure data) is normally disclosed to the equipment vendor 1 for preventive maintenance and the operator 2 requests disclosure of a part of the encrypted data series. However, in this case, since it is sufficient that the operator 2 can confirm that the data has not been falsified, the issuance of the data section signature 303 and the falsification verification process using the data section signature 303 may be omitted.

According to the embodiment described above, it is possible to provide the data protection apparatus 215, the electronic apparatus, the method, and the storage medium capable of executing an encryption process that can selectively decrypt data included in d predetermined section among a large number of pieces of data included in log data.

Note that in the present embodiment, the case in which the information processing system is a product manufacturing system and the data protection apparatus 215 is applied to the manufacturing equipment 21 including the product manufacturing unit 213 and the log data generator 214 has been described. However, the present invention is not limited to this, and in the case in which the information processing system is a power control system, the data protection apparatus 215 is applicable to a power generation apparatus including a power generator and a log data generator, or in the case in which the information processing system is a communication system, the data protection apparatus 215 is applicable to a communication apparatus including a communication controller and a log data generator. Note that the manufacturing equipment 21, the power generation apparatus, and the communication apparatus (i.e., an apparatus including the data protection apparatus 215 and the log data generator 214) described above may be referred to as electronic apparatuses.

In addition, a person involved in the log data generated by the log data generator 214, such as the equipment vendor 1 and the operator 2, may be referred to as an entity.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data protection apparatus, comprising
a processor configured to execute an encryption process on log data including a data frame, wherein
the processor is configured to:
generate a first initial key and a second initial key that correspond to a data frame including a plurality of pieces of data generated along a time sequence;
generate a first key sequence based on the first initial key and a one-way function,
the first key sequence is a key sequence including an encryption key corresponding to each of the pieces of data, and the first key sequence includes the first initial key and a plurality of first encryption keys generated in a forward direction to a time sequence of the pieces of data;
generate a second key sequence based on the second initial key and the one-way function,
the second key sequence is a key sequence including an encryption key corresponding to each of the pieces of data, and the second key sequence includes the second initial key and a plurality of second encryption keys generated in a backward direction to a time sequence of the pieces of data;
encrypt each of the pieces of data with a corresponding encryption key among the first initial key and the first encryption keys included in the first key sequence; and
encrypt each of a plurality of pieces of data encrypted with the corresponding encryption key included in the first key sequence with a corresponding encryption key among the second initial key and the second encryption keys included in the second key sequence.

2. The data protection apparatus of claim 1, further comprising
a storage configured to store a first public key or a first digital certificate for digital signature verification corresponding to a first entity that is a party of the data frame, a second public key or a second digital certificate for digital signature verification corresponding to a second entity that is a party of the data frame, the second entity being different from the first entity, the first initial key, and the second initial key, wherein
the processor is configured to:
receive an input of a disclosure request message requesting disclosure of data included in a predetermined section among a plurality of pieces of data encrypted with an encryption key included in the first key sequence and an encryption key included in the second key sequence,
the disclosure request message indicates a first number indicating data corresponding to a start position of the predetermined section and a second number indicating data corresponding to an end position of the predetermined section, and
the disclosure request message is attached with the digital signature of the first entity and the digital signature of the second entity;
confirm authenticity of the digital signature of the first entity attached to the disclosure request message using the first public key or the first digital certificate;
confirm authenticity of the digital signature of the second entity attached to the disclosure request message using the second public key or the second digital certificate;
generate the first encryption key corresponding to the data indicated by the first number as a decryption key based on the first initial key and the one-way function when confirmation is made that both the digital signature of the first entity and the digital signature of the second entity are authentic;
generate the second encryption key corresponding to the data indicated by the second number as a decryption key based on the second initial key and the one-way function; and
transmit the generated two decryption keys to at least one of the first entity and the second entity.

3. The data protection apparatus of claim 2, wherein
the processor is configured to:
generate a first signature including a first hash value of the entire data frame including the pieces of data and a second hash value of the entire encrypted data sequence including the pieces of encrypted data when the processor encrypts each of the pieces of data with an encryption key included in the first key sequence and an encryption key included in the second key sequence;
output the first signature to the first entity;
verify presence or absence of falsification with the data frame and the encrypted data sequence based on the first signature when the processor receives an input of the first signature output from the first entity;

generate a second signature including a third hash value of data included in the predetermined section and a fourth hash value of encrypted data included in the predetermined section in the case in which confirmation is made that the data frame and the encrypted data sequence have not been falsified; and output the second signature to the first entity, and the second signature is used by the second entity to verify the presence or absence of falsification with data included in the predetermined section and encrypted data included in the predetermined section.

4. The data protection apparatus of claim 1, further comprising a storage configured to store a first public key or a first digital certificate in digital signature verification corresponding to a first entity that is a party of the data frame, the first initial key, and the second initial key, wherein the first initial key and the second initial key are shared by a second entity that is a party of the data frame, the second entity being different from the first entity, wherein the processor is configured to:

receive an input of a disclosure request message requesting disclosure of data included in a predetermined section among a plurality of pieces of data encrypted with an encryption key included in the first key sequence and an encryption key included in the second key sequence, the disclosure request message indicates a first number indicating data corresponding to a start position of the predetermined section and a second number indicating data corresponding to an end position of the predetermined section, and the disclosure request message is attached with the digital signature of the first entity;

confirm authenticity of the digital signature of the first entity attached to the disclosure request message using the first public key or the first digital certificate;

generate the first encryption key corresponding to the data indicated by the first number as a decryption key based on the first initial key and the one-way function when confirmation is made that the digital signature of the first entity is authentic;

generate the second encryption key corresponding to the data indicated by the second number as a decryption key based on the second initial key and the one-way function; and transmit the generated two decryption keys to the first entity.

5. The data protection apparatus of claim 4, wherein the processor is configured to:

generate a first signature including a first hash value of the entire data frame including the pieces of data and a second hash value of the entire encrypted data sequence including the pieces of encrypted data when the processor encrypts each of the pieces of data with an encryption key included in the first key sequence and an encryption key included in the second key sequence; and output the first signature to the first entity.

6. The data protection apparatus of claim 5, wherein the processor is configured to verify presence or absence of falsification with the data frame and the encrypted data based on the first signature when the processor receives an input of the first signature output from the first entity.

7. The data protection apparatus of claim 1, wherein the processor is configured to generate the first initial key and the second initial key using an authentic random number generation function.

8. An electronic apparatus comprising:

the data protection apparatus of claim 1; and a log data generator configured to generate the log data.

9. A method comprising:

generating a first initial key and a second initial key that correspond to a data frame including a plurality of pieces of data generated along a time sequence;

generating a first key sequence based on the first initial key and a one-way function, wherein the first key sequence is a key sequence including an encryption key corresponding to each of the pieces of data, and the first key sequence includes the first initial key and a plurality of first encryption keys generated in a forward direction to a time sequence of the pieces of data;

generating a second key sequence based on the second initial key and the one-way function, wherein the second key sequence is a key sequence including an encryption key corresponding to each of the pieces of data, and the second key sequence includes the second initial key and a plurality of second encryption keys generated in a backward direction to a time sequence of the pieces of data;

encrypting each of the pieces of data with a corresponding encryption key among the first initial key and the first encryption keys included in the first key sequence; and encrypting each of a plurality of pieces of data encrypted with the corresponding encryption key included in the first key sequence with a corresponding encryption key among the second initial key and the second encryption keys included in the second key sequence.

10. A non-transitory computer-readable storage medium storing instructions executed by a computer, wherein the instructions, when executed by the computer, cause the computer to perform:

generating a first initial key and a second initial key corresponding to a data frame including a plurality of pieces of data generated along a time sequence;

generating a first key sequence based on the first initial key and a one-way function, wherein the first key sequence is a key sequence including an encryption key corresponding to each of the pieces of data, and the first key sequence includes the first initial key and a plurality of first encryption keys generated in a forward direction to a time sequence of the pieces of data;

generating a second key sequence based on the second initial key and the one-way function, wherein the second key sequence is a key sequence including an encryption key corresponding to each of the pieces of data, and the second key sequence includes the second initial key and a plurality of second encryption keys generated in a backward direction to a time sequence of the pieces of data;

encrypting each of the pieces of data with a corresponding encryption key among the first initial key and the first encryption keys included in the first key sequence; and encrypting each of a plurality of pieces of data encrypted with the corresponding encryption key included in the first key sequence with a corresponding encryption key among the second initial key and the second encryption keys included in the second key sequence.

* * * * *